US011637580B2

(12) United States Patent
Ross et al.

(10) Patent No.: US 11,637,580 B2
(45) Date of Patent: Apr. 25, 2023

(54) SYSTEMS AND METHODS FOR DESIGNING AND POWERING WIRELESS COMMUNICATION MESH NETWORK NODES

(71) Applicant: L3VEL, LLC, Wilmington, DE (US)

(72) Inventors: Kevin Ross, Lehi, UT (US); Muhammad Ahsan Naim, South Jordan, UT (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 16/931,742

(22) Filed: Jul. 17, 2020

(65) Prior Publication Data

US 2021/0021294 A1    Jan. 21, 2021

Related U.S. Application Data

(60) Provisional application No. 62/879,295, filed on Jul. 26, 2019, provisional application No. 62/875,391, filed on Jul. 17, 2019.

(51) Int. Cl.
*H04L 45/16* (2022.01)
*H04B 1/40* (2015.01)
(Continued)

(52) U.S. Cl.
CPC ............... *H04B 1/40* (2013.01); *H02S 99/00* (2013.01); *H04W 84/18* (2013.01)

(58) Field of Classification Search
CPC .................................. H02J 50/00; H04B 5/00
See application file for complete search history.

(56) References Cited

U.S. PATENT DOCUMENTS 7,466,985 B1    12/2008    Handforth et al.
7,751,350 B1 *   7/2010    Pabst .................... H04W 88/14
                                                        725/127
(Continued)

FOREIGN PATENT DOCUMENTS

KR    10-2010-0132860 A    12/2010
WO          2018083548 A1    5/2018

OTHER PUBLICATIONS

International Searching Authority International Search Report and Written Opinion dated Oct. 21, 2020, issued in connection with International Application No. PCT/US2020/042512, filed Jul. 17, 2020, 13 pages.

(Continued)

*Primary Examiner* — Cindy Trandai
(74) *Attorney, Agent, or Firm* — Lee Sullivan Shea & Smith LLP

(57) ABSTRACT

Disclosed herein are systems and methods related to wireless communication mesh network design, installation, and deployment. In one aspect, a wireless communication node may be located at a building to include one or more antenna mounts, one or more wireless communication radios mounted on the one or more antenna mounts, and a portable power supply coupled to each of the one or more wireless communication radios via a respective cable, where the portable power supply is configured to provide power to each of the one or more wireless communication radios. In another aspect, a wireless communication node located at a building may include a coaxial interface coupled to a power supply installed at the building via a pre-existing cable for a satellite dish, where the coaxial interface may receive power from the power supply via the pre-existing cable and supply the received power to one or more wireless communication radios.

13 Claims, 23 Drawing Sheets

(51) Int. Cl.
*H02S 99/00* (2014.01)
*H04W 84/18* (2009.01)

(56) References Cited

U.S. PATENT DOCUMENTS

| | | | |
|---|---|---|---|
| 8,385,921 B1 | 2/2013 | Shousterman et al. | |
| 8,406,126 B1 | 3/2013 | Leiba et al. | |
| 9,425,985 B1 | 8/2016 | Shousterman et al. | |
| 9,538,331 B2 | 1/2017 | Ross et al. | |
| 9,621,465 B2 | 4/2017 | Ross | |
| 9,860,179 B2 | 1/2018 | Ross | |
| 9,942,776 B2 | 4/2018 | Ross et al. | |
| 9,973,939 B2 | 5/2018 | Ross | |
| 10,027,508 B2 | 7/2018 | Leiba et al. | |
| D856,962 S | 8/2019 | Hart et al. | |
| 10,530,851 B1 | 1/2020 | Hart | |
| 10,530,882 B2 | 1/2020 | Ross | |
| 2005/0068915 A1* | 3/2005 | Atad | H04H 40/90 370/316 |
| 2005/0094585 A1* | 5/2005 | Golden | H04W 84/18 370/310 |
| 2006/0251115 A1 | 11/2006 | Haque et al. | |
| 2007/0038752 A1 | 2/2007 | Jorgensen | |
| 2011/0310519 A1* | 12/2011 | Baba | H04N 5/63 361/91.1 |
| 2014/0057570 A1 | 2/2014 | Leiba | |
| 2014/0136701 A1* | 5/2014 | Billau | H04N 21/4627 709/225 |
| 2015/0358082 A1 | 12/2015 | Ross | |
| 2018/0278465 A1* | 9/2018 | Clott | H04L 12/28 |
| 2018/0331935 A1 | 11/2018 | Ross et al. | |
| 2018/0343685 A1* | 11/2018 | Hart | H04W 24/02 |
| 2018/0375572 A1* | 12/2018 | Garcia | H02J 50/20 |
| 2019/0278347 A1* | 9/2019 | Goergen | H04L 12/40045 |
| 2020/0204212 A1* | 6/2020 | Fawcett | H04B 5/0037 |
| 2020/0212997 A1* | 7/2020 | Harrington | H01Q 1/007 |
| 2021/0119496 A1* | 4/2021 | Smith | H02J 7/345 |

OTHER PUBLICATIONS

Jane Butler et al., 'Wireless Networking in the Developing World', Third Edition, Feb. 2013, ISBN-13: 978-1484039359 [retrieved on Oct. 5, 2020]. Retrieved from the Internet: <URL: https://textbookequity.org/Textbooks/wndw3-wireless%20networking_developing_world.pdf> pp. 176-358.

* cited by examiner

SYSTEMS AND METHODS FOR DESIGNING AND POWERING WIRELESS COMMUNICATION MESH NETWORK NODES

CROSS-REFERENCE TO RELATED APPLICATIONS

This application claims priority to (i) U.S. Provisional App. No. 62/875,391, filed Jul. 17, 2019, and entitled "METHODS FOR PROVIDING POWER TO WIRELESS MESH NETWORK RADIOS," and (ii) U.S. Provisional App. No. 62/879,295, filed Jul. 26, 2019, and entitled "METHODS FOR PROVIDING POWER TO WIRELESS MESH NETWORK NODES," each of which is incorporated herein by reference in its entirety.

BACKGROUND

Wired and wireless networking and communications systems are widely deployed to provide various types of communication and functional features, including but not limited to those for high-speed home internet, security and automation, and/or others. These systems may be capable of supporting communications with a user via a communication connection or a system management action.

Current wireless communication mesh network rollout approaches for fixed wireless access, especially for networks that have a very short point-to-point ("ptp") and/or point-to-multipoint ("ptmp") millimeter wave link length (e.g., 50~300 meters), involve fiber Point of Presence ("PoP") site/node development, and seed home site development that may involve establishing multiple long ptp/ptmp links from a fiber PoP site to a seed homes site. In turn, a line-of-sight ("LOS") analysis is conducted from seed homes for the potential anchor homes (e.g., high-speed internet fixed wireless customers) to identify potential customers, and marketing (including door-to-door sales for a small area) is conducted to build a ring or multiple rings of anchor homes for a wireless communication mesh network. Once, sales and/or installation of anchor homes that form a partial ring, a complete ring, or multiple rings is completed, next round of sales is commenced to target potential customers (LOS availability to the existing nodes) to extend the wireless communication mesh network (e.g., by adding additional anchor homes or rings to the newly-created portion of the wireless communication mesh network).

However, this current wireless communication mesh network rollout approach exhibits many shortcomings. As one example, this current rollout approach slows down the efficiency in designing and deploying a wireless communication mesh network, especially a wireless communication mesh network that is spread over a large geographical area (e.g., 10-20 sq. miles), because of the inherently sequential nature of the intermediary steps in marketing using door-to-door (direct-to-home) sales that is done at a mesh ring or cluster level rather than over a large portion of the intended coverage area of the wireless communication mesh network.

Thus, there exists a need in the art for improved systems and methods relating to wireless communication mesh network design and operation to make the rollout of a wireless communication mesh network more efficient.

Current wireless communication mesh network design approaches exhibit many shortcomings as well. For instance, due to the relatively short length of a wireless communication link of a wireless communication mesh network that operates in the millimeter wave ("mmWave") spectrum, a large number of hops of ptp or point-to-multipoint ptmp communication links are required to connect end users (e.g., customers) to the core network or data center. This results in a requirement of a large number of wireless communication mesh network nodes to cover a medium to large size coverage area. Each wireless communication mesh network node hosting a single or multiple ptp/ptmp mmWave communication equipment requires uninterrupted supply of power for operations. Almost every wireless communication mesh network node not only carries data of an end user (e.g., customer at the node location) but also carries data of other wireless communication mesh network nodes. Hence, interruption in power supply to one wireless communication mesh network node can impact multiple wireless communication mesh network nodes. Current wireless communication mesh network design approaches, however, rely on backup power supply units and cables run from radios to the power supply units of every key communication mesh network node of the wireless communication mesh network, which requires extensive installation time and labor.

Thus, there exists a need in the art for improved systems and methods relating to wireless communication mesh network design and operation using a flexible approach to power wireless communication mesh networks that will result in swift rollout of the wireless communication mesh networks by reducing installation time and cost.

Overview

Disclosed herein are systems and methods that relate to wireless communication mesh network design, installation, and deployment. In one aspect, the disclosed systems and methods may involve a pre-marketing phase that includes various sub-phases, such as social media/online marketing, radio/television-based marketing, and mailer-based marketing, that can generate leads for potential customers (and/or their corresponding customer locations) that expressed interest in subscribing to an internet service based on a wireless communication mesh network. Based on these leads, an area of interest ("AOI") is identified that is used for subsequent door-to-door marketing and sales. A door-to-door marketing/sales agent then uploads information about potential customers who signed an agreement to a computing system (e.g., a server or shared drive) or accesses a software application (e.g., a mobile application) to provide real-time information about potential customers (e.g., mesh network information associated with a given potential customer) to a network-planning engine. The software application may also receive information about potential customers from the pre-marketing phase and send the information to the network-planning engine.

Based on various criteria defined herein, the network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer (and/or its respective location) from a disqualified status to a selected status or from a selected status to a disqualified status. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

In another aspect, the disclosed systems and methods may involve identifying an AOI that is selected based on multiple factors that are described in more detail below. Based on the identified AOI, a pre-marketing phase that includes various sub-phases, such as social media/online marketing, radio/television-based marketing and mailer-based marketing, is executed to generate leads for potential customers (and/or their corresponding customer locations) that expressed interest in subscribing to an internet service based on a wireless communication mesh network. The disclosed process may then transition to a door-to-door marketing phase as described above.

Based on various criteria defined herein, a network-planning engine may then disqualify some potential customers (and/or their corresponding customer locations) and select the remaining potential customers (and/or their corresponding customer locations) for wireless communication mesh network installation/development. In some instances, through a feedback loop, the network-planning engine may convert a potential customer location from a disqualified status to a selected status and vice versa. Further, in some instances, the network-planning engine may also select among those potential customers (and/or their corresponding customer locations) that are not selected for wireless communication mesh network construction for a different tier of service that is built at a later phase. The different tier of service may include different technology, service-level agreement and/or equipment pricing.

In some instances, the network-planning engine may also interact with the door-to-door marketing phase when there is a need to find additional customers (and/or their corresponding customer locations) and add sites at their locations to build a complete wireless communication mesh network. The network-planning engine may also interact with a network installation/deployment phase that may involve a scheduling engine and an optimization engine that are both capable of performing various functions. For instance, based on a list of customer locations and the wireless communication mesh network layout, the scheduling engine (with the help of the optimization engine) may facilitate planning (e.g., on an hourly, daily, and/or weekly basis) the respective schedules of various installation teams working on different phases of the wireless communication mesh network installation/deployment, including electrical installation, line run, antenna mounting, ptp/ptmp node installation, alignment, provisioning, and/or customer service activation at a cluster level, among other examples.

One of ordinary skill in the art will appreciate that some of the foregoing phases can be omitted or can interact with various other phases in various ways or can take place in a different order.

In yet another aspect, the disclosed systems and methods may involve facilitating the design, construction, and/or operation of a wireless communication mesh network. For instance, the present systems and methods may involve facilitating the design and/or construction of wireless communication mesh network nodes that may have the capability to establish ptp extremely-narrow-beam communication links, ptp steerable extremely-narrow-beam communication links, ptmp narrow beam communication links, ultra-wideband ptp communication links, and/or a combination of ptp and ptmp communication links, among other things. Generally speaking, construction of a wireless communication mesh network node may involve various phases.

As one example, the construction of a wireless communication mesh network node may involve a phase for performing a site survey of a building (which may be a wireless mesh network node) to validate the line-of-sight connectivity between the building and a neighboring building (which may also be a wireless mesh network node) to ensure the bi-directional communication links that form part of a wireless mesh communication network can be established. In some instances, the site survey may involve validation of a certain minimum signal threshold for line-of-sight connectivity between the building and a neighboring building instead of validation based on strict line-of-sight connectivity.

As another example, the construction of a wireless communication mesh network node may involve a phase for outdoor installation of wireless communication mesh network radios (e.g., ptp and/or ptmp radios). In one embodiment, outdoor installation of the wireless mesh network radios may take place on the roof of a building (e.g., a home) using one or more antenna mounts. It should be understood, however, that installation of the wireless mesh network radios may take place at a different outdoor location other than a building as well.

As yet another example, construction of a wireless communication mesh network node may involve a phase for running one or more cables from a given wireless communication mesh network radio to a power supply box, which may provide power to the given wireless mesh network radio and carry data between a customer's router and the data center of the wireless communication mesh network. Construction of a wireless communication mesh network node may also involve installing the power supply box and/or aligning wireless communication mesh network radios to establish line-of-sight communication links with neighboring wireless communication mesh network node radios.

In some instances where a building has an existing satellite dish (that may or may not be operational), existing coaxial cables can be used (instead of running a new electric cable) to power wireless mesh network radios if the radios are designed to have a coaxial interface for power. In instances where a radio does not have a coaxial interface to power the radio, an adaptor may be used to covert a power interface of the radio to a coaxial interface. In this respect, the use of an existing satellite dish may save installation time for a wireless communication mesh network node and may in result in operating expense ("OPEX") savings for a wireless communication mesh network operator.

As a further example, construction of a wireless communication mesh network node may involve a phase for installation of a customer's router and activation of a network service. In practice, such installation may take place indoors, such as the customer's home. It should be understood, however, that such installation may take place somewhere other than a customer's home as well.

Further, it should be understood that construction of a wireless communication mesh network node may take various other forms and the phases for such construction may take various other forms as well. For instance, construction of a wireless communication mesh network node may involve more or less phases than the example phases described above, and each phase may involve one or more intermediary steps.

In practice, a wireless communication mesh network node may be dependent on neighboring wireless communication mesh network nodes to carry its end user (e.g., customer) data from a customer's router to a data center of a wireless communication mesh network. In this respect, wireless communication mesh network nodes may not only carry their own respective end user's data but may also help transfer data from other wireless mesh network nodes that belong to other end users of the wireless communication mesh network. Thus, it may not be possible to build wireless communication mesh network nodes in isolation and their end-to-end provisioning and testing may depend on the provisioning, testing, and/or powering of wireless communication mesh network radios from other wireless mesh network nodes (e.g., neighboring wireless communication mesh network nodes).

Further, in practice, the electrical work required to provide power to a given wireless communication mesh network node radio (e.g., running one or more cables from a given wireless communication mesh network radio to a power supply box) may involve a significant amount of installation time. For instance, when electrical work to provide power to a given wireless communication mesh network node radio is required to be performed outside of a building, such electrical work may involve installation of a power supply box and running electrical and data cables from the power supply box to the roof of the building where the given wireless communication mesh network radio is planned to be installed. In instances where the electrical work to provide power to a given wireless communication mesh network node radio is required to be performed inside of a building, such electrical work may involve additional steps that require scheduling and coordination with a customer who owns or resides in the building.

Further yet, in practice, the successful completion of constructing a wireless communication mesh network node may depend on the completion of such electrical work required to provide power to a given wireless communication mesh network node radio, which may in turn facilitate establishing bi-directional communication links with other neighboring wireless communication mesh network nodes and collectively form a wireless communication mesh network. However, in some instances, even after such electrical work is completed, a given wireless communication mesh network radio may still not be able to establish line-of-sight communications with a wireless communication mesh network radio from a neighboring wireless communication mesh network node or a building owner or customer may decide not to be part of the wireless communication mesh network. In such instances, while wireless communication mesh network radios and antenna masts can be removed and can be reused to build a different wireless mesh network node, the electrical work completed to provide power to a given wireless mesh network radio (e.g., cable and/or power supply box installation) cannot be reused and may result in loss of capital expenditures for a wireless communication mesh network operator.

To address one or more problems involving the construction of a wireless communication mesh network node, in one aspect, disclosed herein is a portable modular unit that can be easily installed on a building, where the portable modular unit comprises a portable power supply that can be used to efficiently provide power to a given wireless communication mesh network node radio that may be installed on the roof of a building (or some other the outdoor location). The portable power supply may take various forms.

For example, the portable power supply may include a solar panel. It should be understood, however, that the portable power supply may take various other forms, such as a power supply that includes a backup battery. In this respect, the portable power supply may be capable of providing power to one or more radios for multiple days, weeks, or perpetually provide power (e.g., using solar panels).

Further, in some embodiments, the portable modular unit may also include antenna mounts, wireless communication mesh network radios, among other equipment needed to efficiently construct a wireless communication mesh network node. Generally speaking, this portable modular unit may initially provide power to wireless communication mesh network radios, and enable a wireless mesh network installer to quickly configure the wireless mesh network radios and activate the wireless communication mesh network node without requiring the installer to perform any electrical work (e.g., cable and/or power supply box installation). At later time, such as when a particular section of the wireless communication mesh network is completed (e.g., by powering multiple wireless communication network nodes in a particular section), the wireless communication mesh network installer may easily remove a portable power supply from a portable modular unit at a given wireless communication network node and replace it with an electrical cable run from a power supply box to draw power from the main power line of a building. Other components of a portable modular unit (e.g., radios) may also be easily removed from the portable modular unit and installed using roof mounts.

Accordingly, in one aspect, disclosed herein is a wireless communication node of a wireless communication mesh network located at a building, where the wireless communication node includes (1) one or more antenna mounts, (2) one or more wireless communication radios mounted on the one or more antenna mounts, and (3) a portable power supply coupled to each of the one or more wireless communication radios via a respective cable, where the portable power supply is configured to provide power to each of the one or more wireless communication radios.

In another aspect, disclosed herein is a wireless communication node of a wireless communication mesh network located at a building, where the wireless communication node includes (1) one or more antenna mounts, (2) one or more wireless communication radios mounted on the one or more antenna mounts, and (3) a coaxial interface that is coupled to a power supply installed at the building via a pre-existing cable for a satellite dish, where the coaxial interface is configured to receive power from the power supply via the pre-existing cable and supply the received power to the one or more wireless communication radios.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

In accordance with the present disclosure, disclosed herein are systems and methods that relate to wireless communication mesh network design and operation. In one aspect, the present systems and methods may involve various phases to construct a wireless communication mesh network, such as a pre-marketing phase, a door-to-door marketing phase, a planning phase, and a network installation/deployment phase, among other phases described in more detail herein.

Figure 1A:
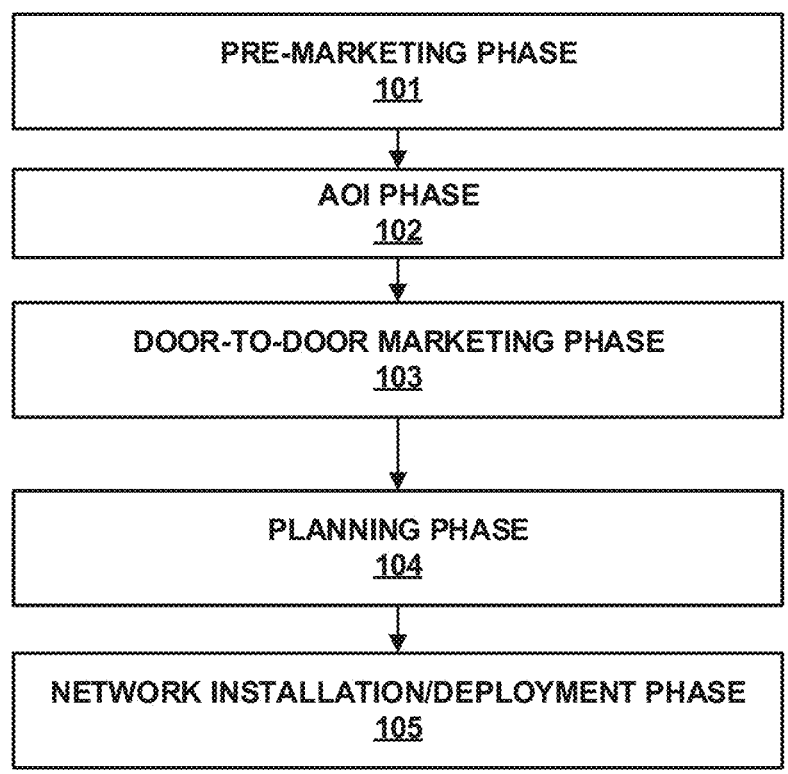
FIG. 1A depicts an example flow diagram for designing and deploying a wireless communication mesh network, in accordance with various aspects of this disclosure.

For instance, FIG. 1A depicts an example flow diagram for designing and deploying a wireless communication mesh network that may comprise point-to-point ("ptp") and/or point-to-multipoint ("ptmp") links. As shown in FIG. 1A, the example process may involve pre-marketing phase 101, which may involve generating leads for potential customers. Pre-marketing phase 101 may involve various marketing techniques, including but not limited to marketing techniques that do not require a salesperson to physically visit a potential customer's home for marketing.

As further shown in FIG. 1A, pre-marketing phase 101 may be followed by an area of interest ("AOI") phase 102 that may involve defining an AOI (or multiple AOIs) for designing a wireless communication mesh network. In some instances, an AOI may be defined based on leads that were generated during pre-marketing phase 101 (e.g., a list of potential customers that expressed interest in subscribing to a wireless communication mesh network service).

The example process may then transition from AOI phase 102 to door-to-door marketing phase 103, which may involve a salesperson physically visiting a given potential customer's home to sign-up the given potential customer for a wireless communication mesh network service. Based on the leads generated from pre-marketing phase 101 and contracted customers in door-to-door marketing phase 103, a subset of customer locations may be selected as wireless communication mesh network nodes for designing a wireless communication mesh network during planning phase 104. In turn, the network installation/deployment phase 105 may involve wireless communication mesh network node installation based on the selected customer locations at planning phase 104.

In practice, each of the foregoing phases in FIG. 1A may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, one of ordinary skill in the art will appreciate that the example flow diagram shown in FIG. 1A may be altered to include more or less phases or can be rearranged in a different order.

Figure 1B:
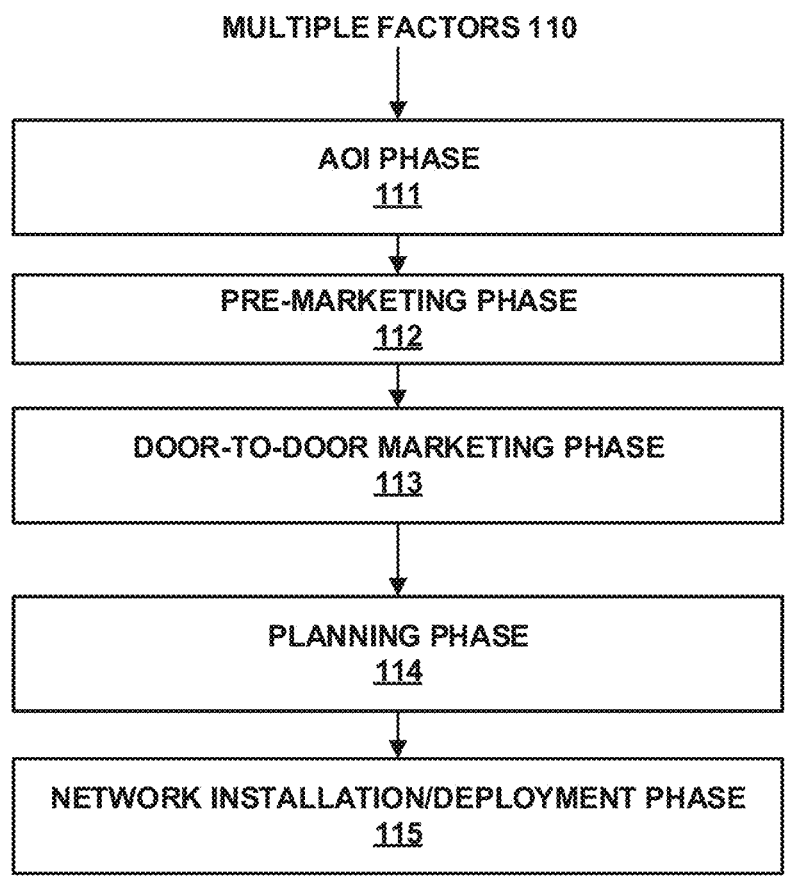
FIG. 1B depicts another example flow diagram for designing and deploying a wireless communication mesh network, in accordance with various aspects of this disclosure.

Referring to FIG. 1B, another example flow diagram for designing and deploying a wireless communication mesh network is described herein. As shown, the example process may begin with consideration of multiple factors 110 that may lead to the selection of an AOI at AOI phase 111. Multiple factors 110 may include the availability of designing and deploying a wireless communication mesh network with fiber connectivity at a reasonable cost, a level of vegetation in the AOI, population density, demographics, and/or average annual household income, among other possible factors.

As further shown in FIG. 1B, after considering multiple factors 110, an AOI for designing and deploying a wireless communication mesh network may be selected at AOI phase 111, which is followed by pre-marketing phase 112. The example process may then transition from pre-marketing phase 112 to door-to-door marketing phase 113, which may involve a salesperson physically visiting a given potential customer's home to sign-up the given potential customer for a wireless communication mesh network service.

Based on the leads generated from pre-marketing phase 112 and contracted customers at door-to-door marketing phase 113, a subset of customer locations may be selected as wireless communication mesh network nodes for designing a wireless communication mesh network during planning phase 114. In turn, the network installation/deployment phase 115 may involve wireless communication mesh network node installation and deployment based on the selected customer locations at planning phase 114.

In practice, each of the foregoing phases in FIG. 1B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, one of ordinary skill in the art will appreciate that the example flow diagram shown in FIG. 1B may be altered to include more or less phases or can be rearranged in a different order.

In general, the pre-marketing phase of the disclosed process for designing and deploying a wireless communication mesh network may take various forms and may involve various functions.

Figure 2A:
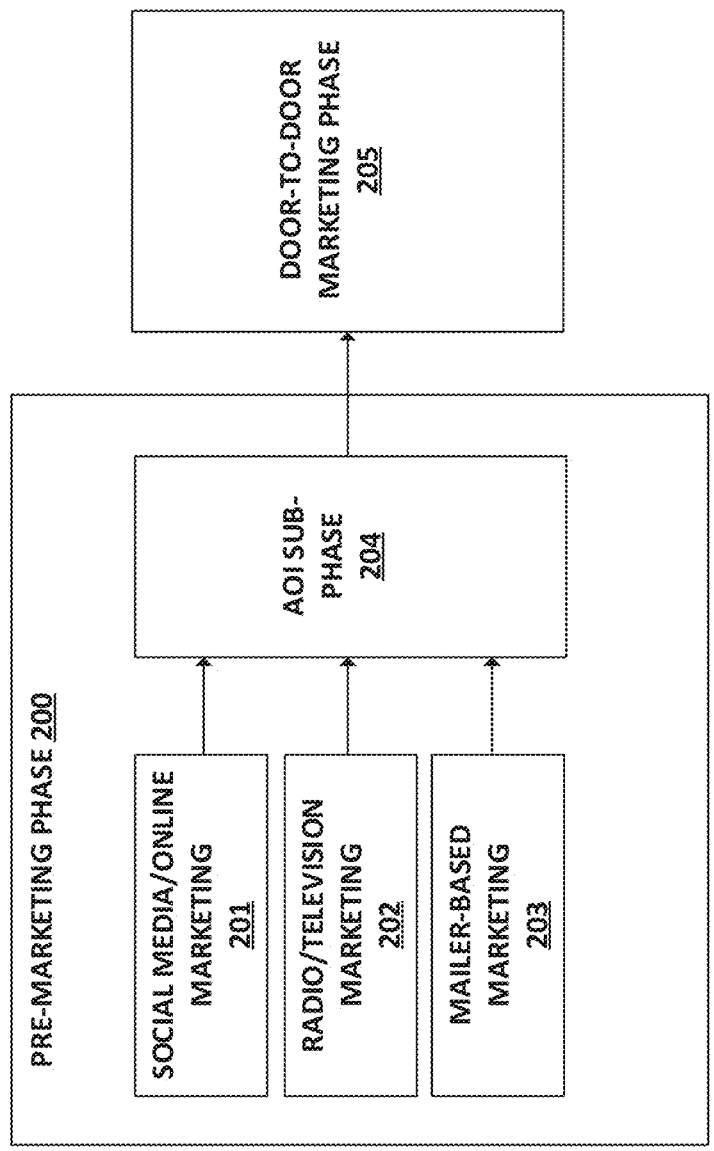
FIG. 2A depicts an example pre-marketing phase, in accordance with various aspects of this disclosure.

To illustrate, FIG. 2A depicts an example pre-marketing phase 200, which is followed by a door-to-door marketing phase 205. Generally speaking, the pre-marketing phase 200 may be similar to pre-marketing phase 101 of FIG. 1A. As shown, pre-marketing phase 200 may comprise a social media/online marketing sub-phase 201, a radio/television marketing sub-phase 202, and a mailer-based marketing sub-phase 203. As also shown, pre-marketing phase 200 may include an AOI sub-phase 204 where one or more AOIs are defined—although in line with the discussion above, it should be understood that an AOI phase may also be viewed as a separate phase from pre-marketing phase 200.

Social media/online marketing sub-phase 201 may take various forms. For instance, social media/online marketing sub-phase 201 may involve various techniques, including but not limited to search engine optimization, where mobile internet users and/or internet users at in-building locations are approached based on certain criteria. The criteria may include a particular region with certain population density, demographics (e.g., age group, income group, etc.), and/or ownership or residence in a certain type of housing, among other examples. In some instances, certain criteria other than the criteria described above may be used or blanket social media/online marketing may be used.

Radio/television marketing sub-phase 202 may take various forms as well. For instance, radio/television marketing sub-phase 202 may involve radio/television marketing in specific regions based on certain criteria. The criteria may include a particular region with certain population density, demographics (e.g., age group, income group, etc.), and/or ownership or residence in a certain type of housing, among other examples. In some instances, certain criteria other than the criteria described above may be used or blanket radio/television marketing may be used.

Likewise, mailer-based marketing sub-phase 203 may take various forms. For instance, mailer-based marketing sub-phase 203 may involve mailer-based marketing in specific regions based on certain criteria. The criteria may include a particular region with certain population density, demographics (e.g., age group, income group, etc.), and/or ownership or residence in a certain type of housing, among other examples. In some instances, certain criteria other than the criteria defined above may be used or blanket mailer-based marketing may be used.

As noted above, pre-marketing phase 200, which comprises social media/online marketing sub-phase 201, radio/television marketing sub-phase 202 and mailer-based marketing sub-phase 203, may generate leads for potential customers that are interested in subscribing to a wireless communication mesh network service. Based on the generated leads, one or more AOIs may be identified at AOI sub-phase 204, and these identified one or more AOIs may be later used during door-to-door marketing phase 205.

In practice, each of the foregoing phases in FIG. 2A may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, while sub-phases 201, 202 and 203 are shown to take place in parallel, it should be understood that a subset of these sub-phases can take place sequentially and may take any order. Still further, it should be understood that pre-marketing phase 200 may include more or less sub-phases shown in FIG. 2A.

Figure 2B:
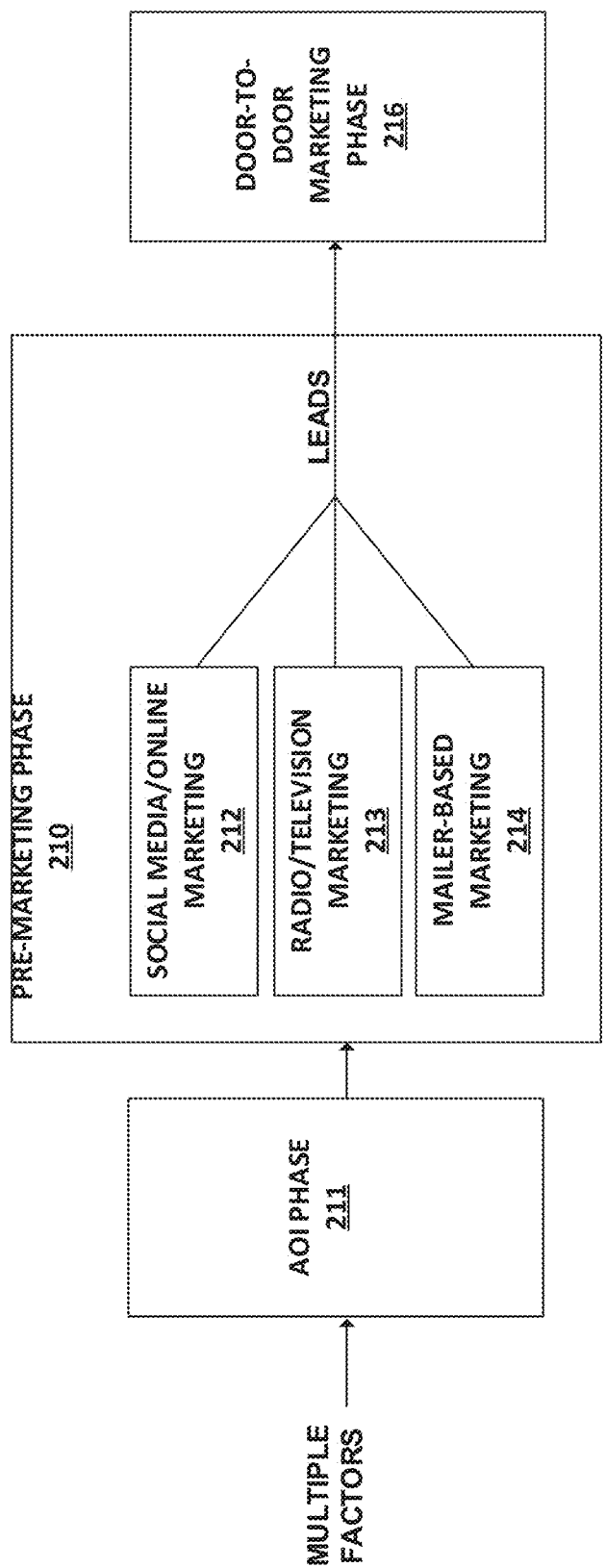
FIG. 2B depicts another example pre-marketing phase, in accordance with various aspects of this disclosure.

Turning to FIG. 2B, another example pre-marketing phase 210 is described, which is followed by a door-to-door marketing phase 216 and is preceded by AOI phase 211 where one or more AOIs are determined based on multiple factors. As noted above, the multiple factors may include the availability of a fiber Point of Presence ("PoP") building at a reasonable cost, line-of-sight ("LOS") profile of the fiber PoP building (e.g., roof) to its surrounding area, population density, residential home density, demographics, and/or vegetation, among other examples.

Generally speaking, pre-marketing phase 210 in FIG. 2B may be similar to pre-marketing phase 112 of FIG. 1B. As shown in FIG. 2B, pre-marketing phase 210 may comprise a social media/online marketing sub-phase 212, radio/television marketing sub-phase 213, and a mailer-based marketing sub-phase 214. These sub-phases may take various forms similar to social media/online marketing sub-phase 201, radio/television marketing sub-phase 202, and mailer-based marketing sub-phase 203 of FIG. 2A. In this respect, pre-marketing phase 210 of FIG. 2B, which comprises social media/online marketing sub-phase 212, radio/television marketing sub-phase 213 and mail-based marketing sub-phase 214, may generate leads to potential customers that are interested in subscribing to a wireless communication mesh network service. As further shown in FIG. 2B, leads may be later used during door-to-door marketing phase 216.

In practice, each of the foregoing phases in FIG. 2B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input. Further yet, while sub-phases 212, 213, and 214 are shown to take place in parallel, it should be understood that a subset of these sub-phases can take place sequentially and may take any order. Still further, it should be understood that pre-marketing phase 210 may include more or less sub-phases.

Figure 3A:
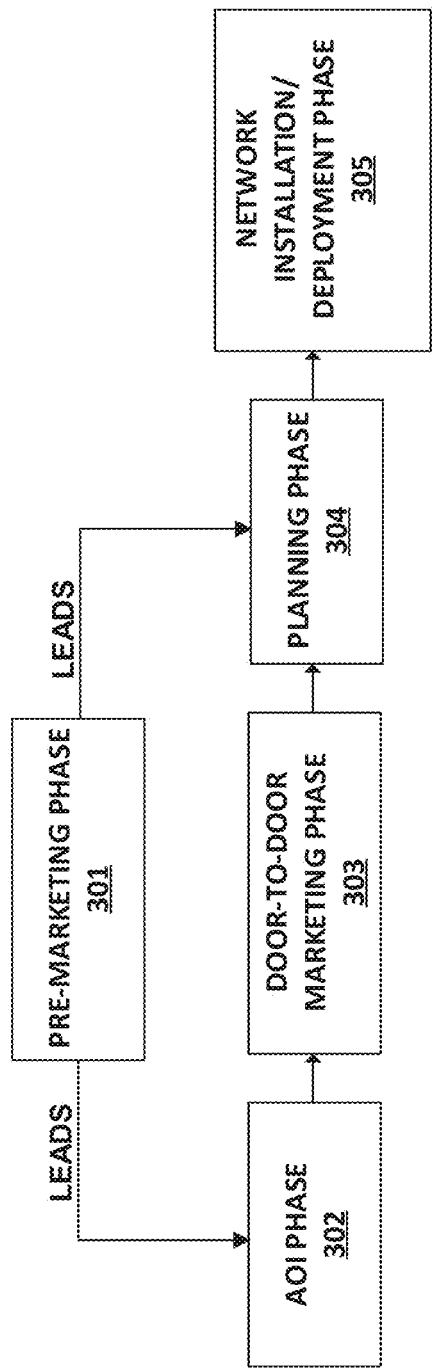
FIG. 3A depicts another example flow diagram for designing and deploying a wireless communication mesh network, in accordance with various aspects of this disclosure.

Turning to FIG. 3A, another example flow diagram for designing and deploying a wireless communication mesh network is described. As shown, FIG. 3A includes a pre-marketing phase 301 to generate leads for potential customers, an AOI phase 302, and a door-to-door marketing phase 303, each of which has been described previously. As noted above, door-to-door marketing phase 303 may involve a salesperson physically visit a potential customer's home for marketing and sales of wireless communication mesh network services.

As further shown, FIG. 3A also includes a planning phase 304. Planning phase 304 may involve receiving information about potential customers (e.g., an up-to-date list of potential customers and/or their corresponding customer locations/homes) that have shown interest in subscribing to a wireless-communication-mesh-network service from pre-marketing phase 301. Planning phase 304 may also involve receiving potential customer information from door-to-door marketing phase 303. Based on various factors, a wireless communication mesh network may then be designed at planning phase 304 by rejecting certain potential customers (and/or their corresponding customer locations/homes) among the received list of potential customers and selecting the remaining potential customers (and/or their corresponding customer locations/homes) for wireless communication mesh network installation/deployment. These factors may include the list of potential customers (and/or their corresponding customer locations), LOS profile (e.g., a number of surrounding homes a potential customer's home has a LOS path), vegetation profile, number of hops, length of link, target market penetration rate, number of service tiers, number of technology tiers, among other possible factors.

In turn, network installation and deployment may take place at a network installation/deployment phase 305, which may involve wireless communication mesh network node installation and deployment based on the selected customer locations at planning phase 304 as described above.

Figure 3B:
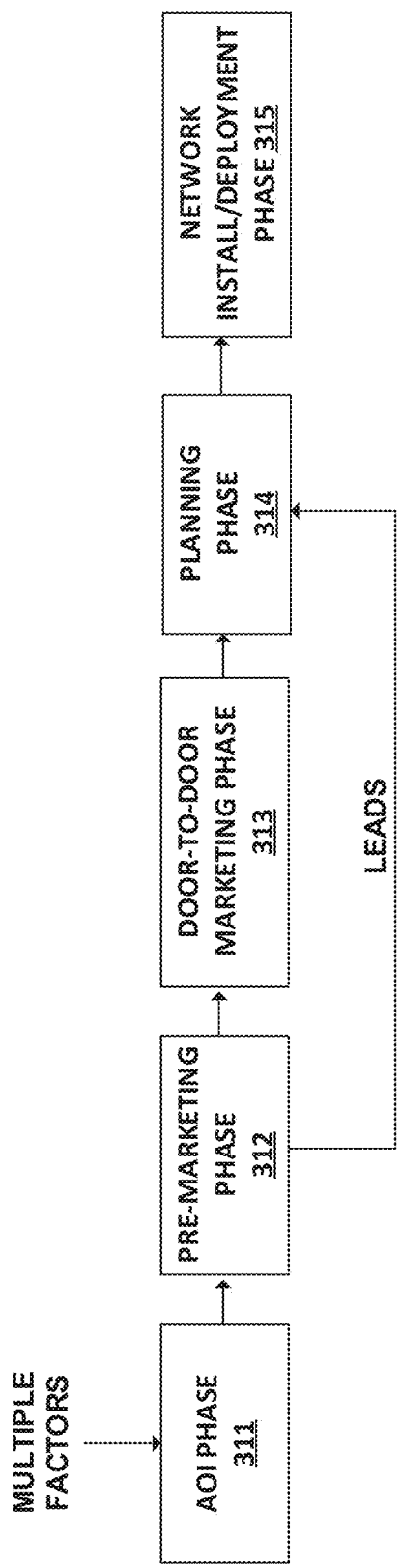
FIG. 3B depicts yet another example flow diagram for designing and deploying a wireless communication mesh network, in accordance with various aspects of this disclosure.

Turning to FIG. 3B, another example flow diagram for designing and deploying a wireless communication mesh network is described. As shown, FIG. 3B includes an AOI phase 311 that may involve determining one or more AOIs based on multiple factors, which may include the availability of a fiber PoP building at a reasonable cost, LOS profile of the building (e.g. roof) to its nearby surrounding area, population density, residential home density, demographics, and/or vegetation, among other possible factors. FIG. 3B also includes a pre-marketing phase 312 to generate leads for potential customers, a door-to-door marketing phase 313, a planning phase 314, and a network installation/deployment phase 315, each of which has been described above with respect to FIG. 3A and are described in more detail below.

In practice, each of the foregoing phases in FIGS. 3A-B may be implemented in whole or in part by a computing system, which may comprise a network interface, at least one processor, data storage, and program instructions stored in the data storage that are executable by the at least one processor to perform one or more of the functions described above. Further, one of ordinary skill in the art will appreciate that such a computing system may carry out one or more of the functions described above based on user input.

Figure 4:
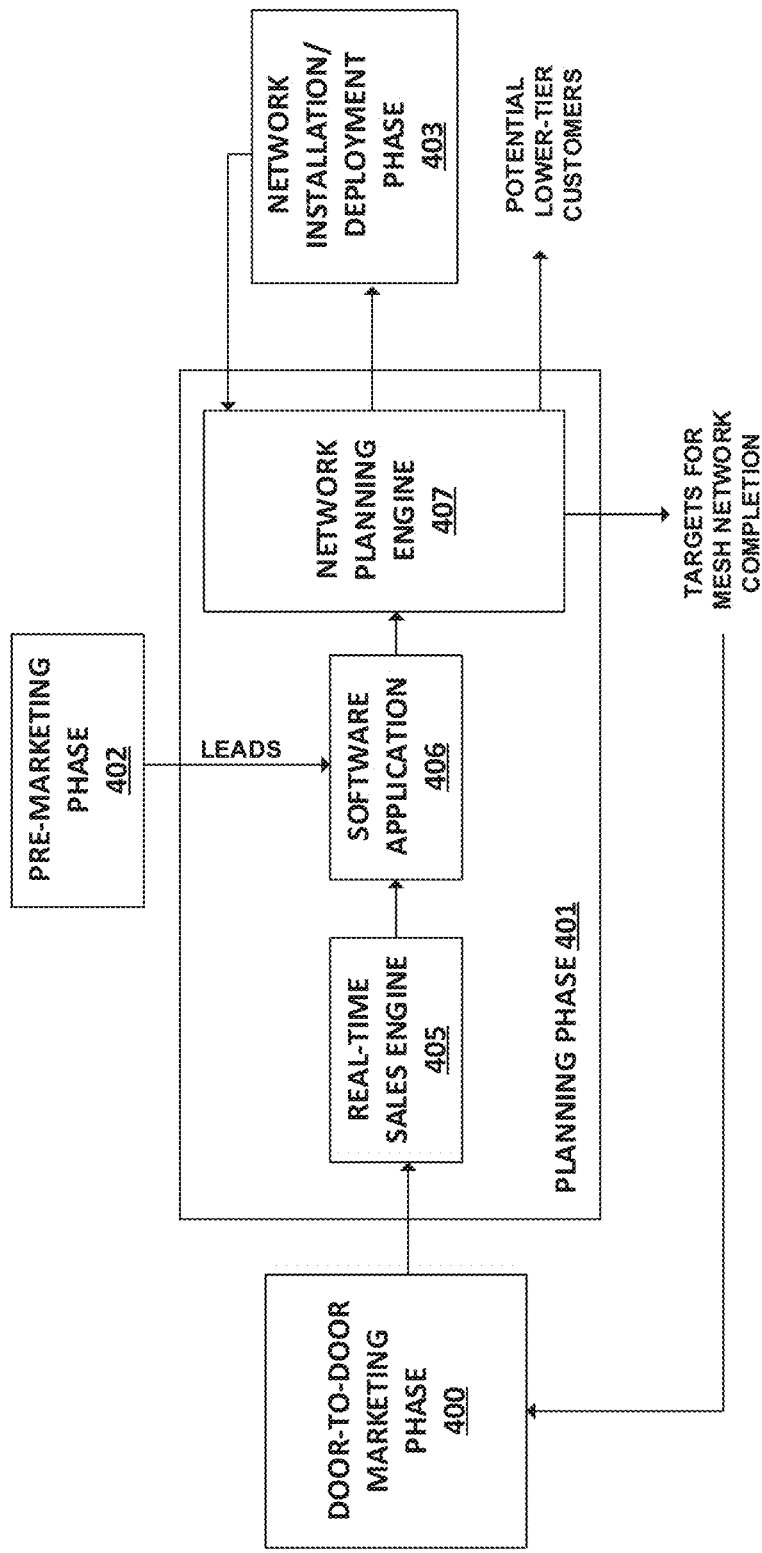
FIG. 4 depicts yet another example flow diagram for designing and deploying a wireless communication mesh network, in accordance with various aspects of this disclosure.

Turning to FIG. 4, another example flow diagram for designing and deploying a wireless communication mesh network is described. As shown, FIG. 4 includes various high-level phases, such as a door-to-door marketing phase 400, a planning phase 401, a pre-marking phase 402, and a network installation/deployment phase 403. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

Generally speaking, door-to-door marketing phase 400 may take various forms. For instance, as noted above, door-to-door marketing phase 400 may involve a salesperson physically visiting a potential customer's home for marketing and sales of wireless communication mesh network services. In some instances, door-to-door marketing and sales at door-to-door marketing phase 400 may be involve a salesperson physically visiting potential customer homes that are in a certain AOI. In other instances, door-to-door marketing phase 400 may involve blanket door-to-door marketing. Further, in some implementations, door-to-door marketing phase 400 may involve generating a list of potential customers that have shown interest in subscribing to a wireless communication mesh network service by signing a contractual agreement for the service.

During door-to-door marketing phase 400, information about interactions with potential customers may be collected and provided to a computing system that is involved in implementing planning phase 401. For example, after potential customers have signed a contractual agreement for the wireless communication mesh network service, the signed contracts may be uploaded to a data store that is included within or can otherwise be accessed by a computing system involved in implementing planning phase 401, such that information about the potential customers (e.g., customer location information) can be available to such a computing system.

As further shown in FIG. 4, planning phase 401 may be carried out via a real-time-sales engine 405, a software application 406, and a network-planning engine 407, each of which may take the form of program instructions that are executable by a computing system involved in implementing planning phase 401.

Real-time-sales engine 405 may generally function to receive information about potential customers that are identified during door-to-door marketing phase 400, where such information may be obtained in "real time" (i.e., during or shortly after the interaction with the potential customer takes place). In this respect, real-time-sales engine 405 may interface with client applications running on devices being used by the salespersons that are interacting with the potential customers during door-to-door marketing phase 400.

Further, software application 406 (e.g., a mobile application) may generally function to obtain information about potential customers (e.g., customer location information) that has been generated during door-to-door marketing phase 400 (which may be received via real-time-sales engine 405) as well as during pre-marking phase 402 (e.g., leads) and then provide potential-customer information to network-planning engine 407. In this respect, software application 406 may be an integral part in gathering and maintaining information about potential customers. (One of ordinary skill in the art will appreciate that software application 406 may interact with a data store that is configured to store the potential-customer information).

Further yet, network-planning engine 407 may generally function to receive potential-customer information from software application 406 and then perform an evaluation of such potential-customer information in order to identify and output information regarding a subset of potential customers (and/or their corresponding customer locations) for wireless communication mesh network installation/deployment.

For instance, network-planning engine 407 may function to reject certain potential customers (and/or their corresponding customer locations) from among a list of potential customers based on one or more factors and then select the remaining potential customers (and/or their corresponding customer locations) for wireless communication mesh network installation/deployment. These factors may include the list of potential customers (and/or their corresponding customer locations), LOS profile (e.g., a number of surrounding homes a potential customer's home has a LOS path), vegetation profile, number of hops, length of link, target market penetration rate, number of service tiers, number of technology tiers, among other possible factors.

Additionally, network-planning engine 407 may function to identify (and output information regarding) some potential customers (and/or their corresponding customer locations) from among a list of potential customers for a different tier of service provided through the wireless communication mesh network (e.g., a lower tier internet service) based on similar criteria described above if their homes are not suitable or ideal for primary wireless communication mesh network services. In this respect, the potential customers that are identified for the different tier of service may be the potential customers that are rejected based on the one or more factors described above, or some other subset of potential customers. The potential customers that are identified for the different tier of service by network-planning engine 407 may then be used to design a different tier for the wireless communication mesh network that may comprise a different wireless communication mesh network technology, a different Service Level Agreement ("SLA"), and/or a different pricing model.

Additionally yet, network-planning engine 407 may function to identify (and output information regarding) specific areas where customers are needed to complete and/or expand the wireless communication mesh network. These areas may include potential customers that were not identified during pre-marketing phase 402 or door-to-door marketing phase 400. The identification of the specific areas where customers are needed to complete and/or expand the wireless communication mesh network may then trigger a fresh round of door-to-door marketing focusing on customers in the identified area.

Network-planning engine 407 may take various other forms and may carry out various other functions as well.

After network-planning engine 407 outputs information about potential customers (and/or their corresponding customer locations) that have been identified for wireless communication mesh network installation/deployment, network installation and deployment may take place at network installation/deployment phase 406. Network installation/deployment phase 406 may take various forms.

Figure 5:
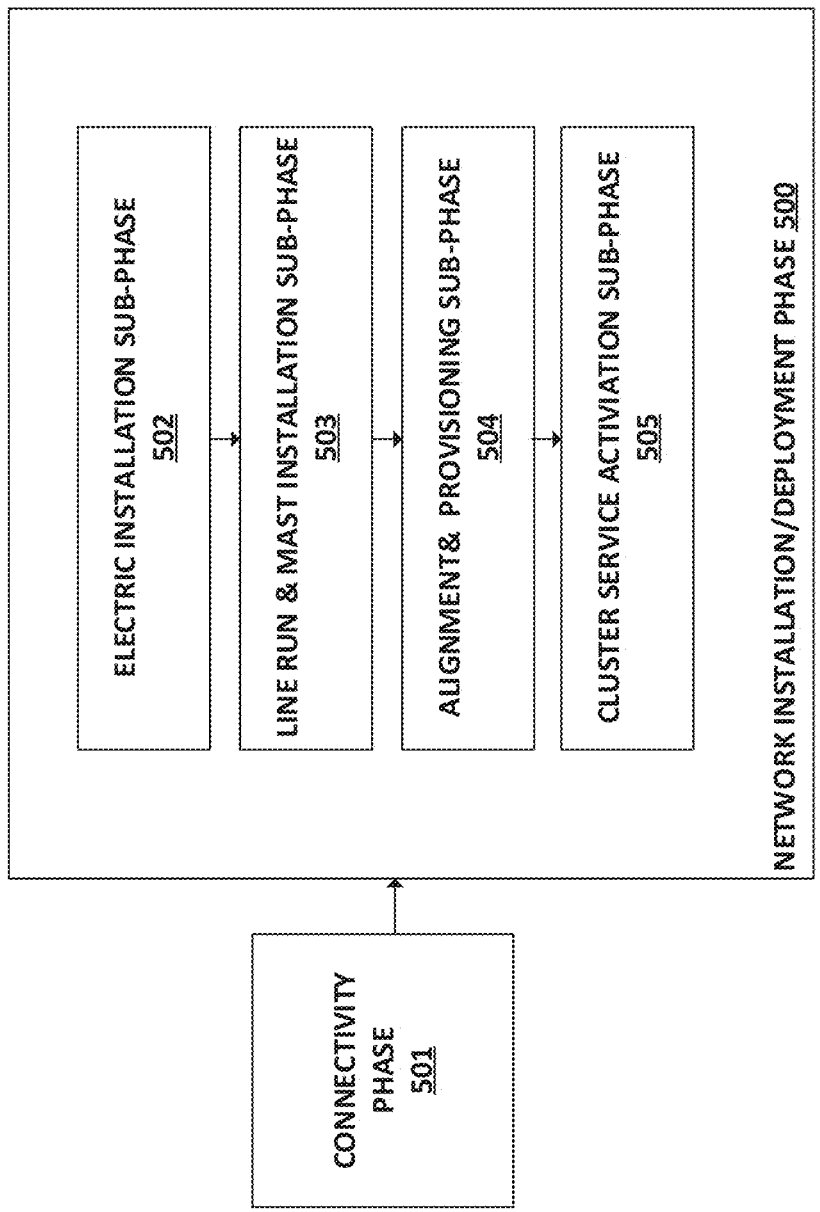
FIG. 5 depicts an example network installation/deployment phase, in accordance with various aspects of this disclosure.

To illustrate, FIG. 5 depicts an example network installation/deployment phase 500. As shown, a wireless communication mesh network site (e.g., a tall building) that has fiber connectivity and ultimately connects a wireless communication mesh network to a CORE network and/or data center may be constructed at connectivity phase 501 that precedes network installation/deployment phase 500. In turn, network installation and deployment of wireless communication mesh network nodes may then take place at network installation/deployment phase 500, which may involve installing wireless communication mesh network equipment on a rooftop of a customer's home.

As further shown in FIG. 5, network installation/deployment phase 500 may comprise various sub-phases. For instance, network installation/deployment phase 500 may comprise an electrical installation sub-phase 502, which may involve installing a power box on the side of a customer's home along an exterior wall (or any other appropriate location) to provide power to telecommunication equipment of the wireless communication mesh network. Additionally, network installation/deployment phase 500 may comprise a line-run-and-antenna-mast installation sub-phase 503 that may involve installation of a line run and mast along with actual mounting of ptp/ptmp equipment. Additionally yet, network installation/deployment phase 500 may comprise an alignment-and-provisioning sub-phase 504 that may involve (1) aligning antennas of wireless communication mesh network equipment to ensure LOS connectivity between a node of one customer home with the node of another nearby customer home and establish a LOS-based ptp or ptmp link, and (2) configuring network settings of the ptp or ptmp nodes to ensure end-to-end connectivity from a customer home to a CORE network or data center.

It should be noted that, in some instances, sub-phases 502 to 504 of FIG. 5 may not involve any installation inside a customer's home and installation may be performed without the need for customers to be present at their homes.

As further shown in FIG. 5, network installation/deployment phase 500 may also comprise a cluster-service-activation sub-phase 505 that may involve installing routers inside customer homes to connect a wireless communication mesh network node installed at a customer home's roof-top to network devices of the customer and provide internet connectivity. Generally speaking, cluster-service-activation sub-phase 505 may typically require customers to be present in their homes, unlike sub-phases 502-504. Installation at cluster-service-activation sub-phase 505 may be performed after building and testing a complete ring (or several rings) forming a cluster of nodes for the wireless communication mesh network.

While FIG. 5 shows sub-phases 502-505 of network installation/deployment phase 500 taking place in a sequential manner, it should be understood that in other embodiments, some or all of these subphases may take place in parallel.

Figure 6:
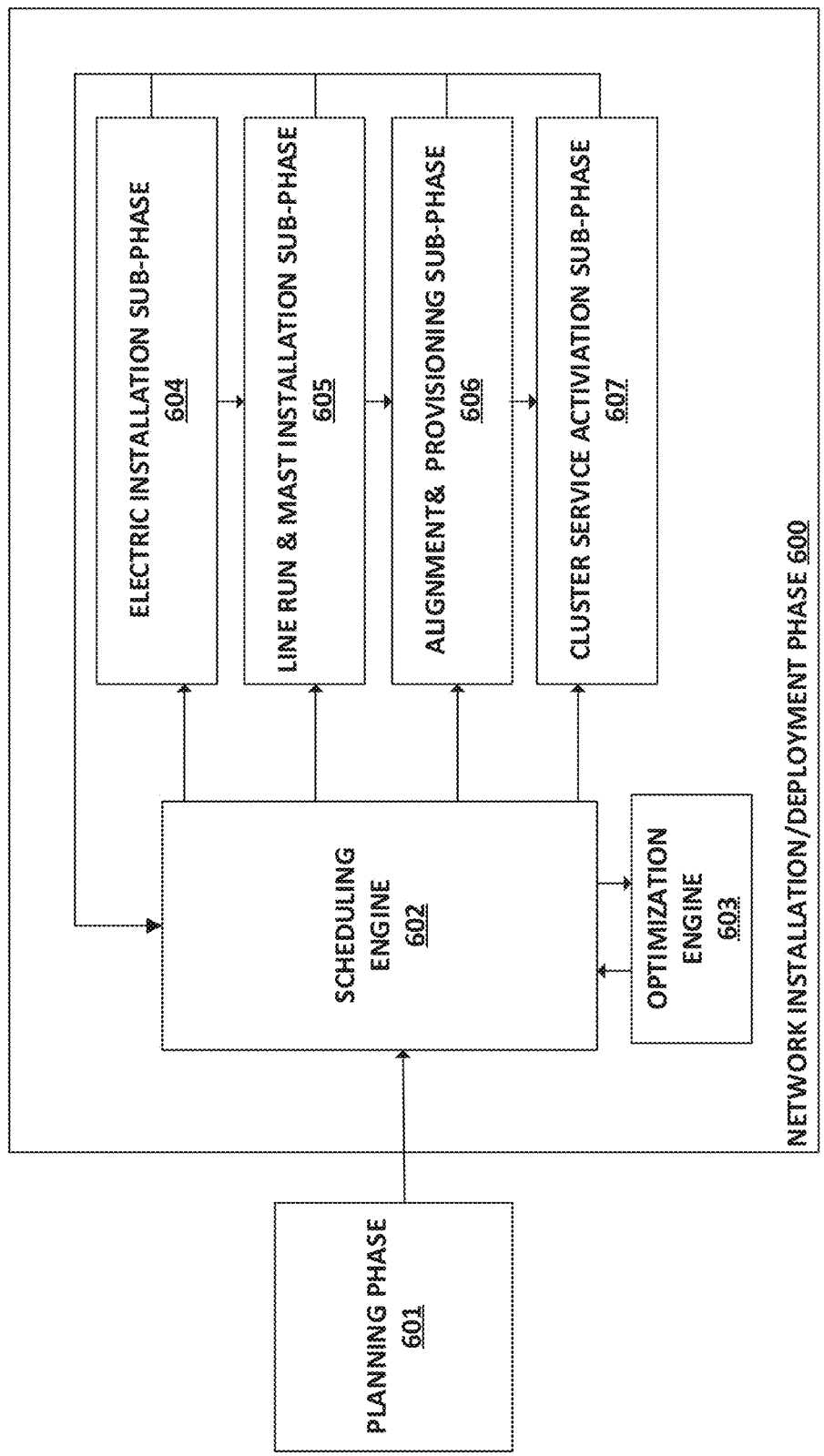
FIG. 6 depicts another example network installation/deployment phase, in accordance with various aspects of this disclosure.

Referring to FIG. 6, another example network installation/development phase 600 for a wireless communication mesh network is shown. In FIG. 6, network installation/development phase 600 includes a scheduling engine 602, which may take the form of program instructions that are executable by a computing system involved in implementing network installation/deployment phase 600.

Scheduling engine 602 may generally function to receive a task from a planning phase 601, which may take a similar form to the planning phases that have been described above. For instance, planning phase 601 may provide scheduling engine 602 with a list of potential customers (and/or their corresponding customer locations) and may also provide wireless communication mesh network design information that defines how ptp/ptmp nodes should be connected between the customer locations (for antenna alignment and selection of a region on a roof of a customer home for antenna mounting). Based on such information, scheduling engine 602 may schedule different network installation teams for various sub-phases of network installation/deployment phase 600, which may include an electric-installation sub-phase 604, a line-run-and-mast installation sub-phase 605, an alignment-and-provisioning subphase 607, and a cluster-service-activation subphase 608, where each of these sub-phases may take similar forms to the respective sub-phases described above with respect to FIG. 5.

As further shown, in some embodiments, scheduling engine 602 may interact with an optimization engine 603, which may likewise take the form of program instructions that are executable by a computing system involved in implementing network installation/deployment phase 600. Optimization engine 603 may generally function to optimize the scheduling of subphases 604-608. For instance, in one implementation, optimization engine 603 may apply an artificial intelligence-based technique (e.g., simulated annealing) to devise a daily/weekly plan for network installation teams that optimizes the route between wireless communication mesh network customer locations. Further, in some instances, based on real-time feedback information from sub-phases 604-608 (which could be provided to optimization engine 603 via scheduling engine 602), optimization engine 603 may instruct scheduling engine 602 to change the scheduling of sub-phases 604-608 to optimize the installation process.

Figure 7A:
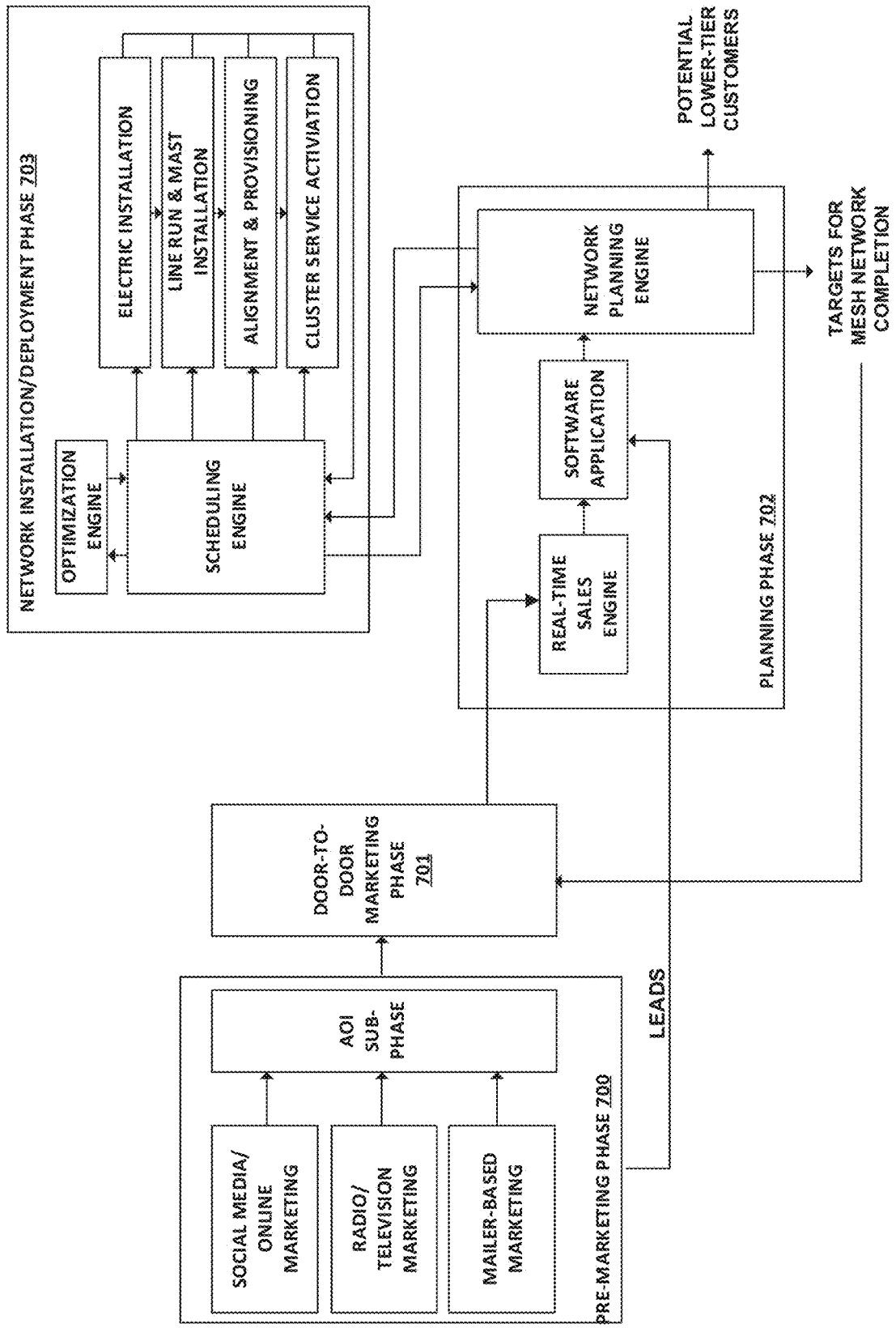
FIG. 7A depicts an example summary level flow diagram for designing and deploying a wireless communication mesh network, in accordance with various aspects of this disclosure.

Referring to FIG. 7A, an example summary-level flow diagram for designing and deploying a wireless communication mesh network is shown to include various phases that have been described above. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

As shown, FIG. 7A comprises a pre-marketing phase 700 that may include sub-phases for social media/online marketing, radio/television-based marketing, and mailer-based marketing, and may involve generating leads for potential customers that have expressed interest in subscribing to a wireless communication mesh network service. Based on the generated leads, one or more AOIs may then be identified at an AOI sub-phase of pre-marketing phase 700, which may in turn be used at a door-to-door marketing phase 701.

During door-to-door marketing phase 701, information about interactions with potential customers may be collected and provided to a computing system that is involved in implementing planning phase 702. For instance, during door-to-door marketing phase 701, a door-to-door salesperson may upload information about potential customers who have signed a contractual agreement for the wireless communication mesh network service to a data store that is included within or can otherwise be accessed by a computing system involved in implementing planning phase 702, such that information about the potential customers (e.g., customer location information) can be available to such a computing system. In turn, during planning phase 702, a software application (e.g., a mobile application) may function to (i) obtain information about potential customers that has been generated during door-to-door marketing phase 701 (e.g., information that has been received in real-time) and/or information about potential customers that has been generated during pre-marketing phase 700 and (ii) send such information to a network-planning engine of planning phase 702.

Based on various criteria described above, the network-planning engine of planning phase 702 may then output various information. For example, the network-planning engine may disqualify some potential customers (and/or their corresponding customer locations), select the remaining customers (and/or their corresponding customer locations) for wireless communication mesh network installation/deployment, and then output information about the selected customers. Through a feedback loop, the network-planning engine may also convert a potential customer from a disqualified status to a selected status or vice versa.

As another example, the network-planning engine may select some potential customer locations (e.g., homes) among those potential customer locations that were not selected for wireless communication mesh network construction for a different tier of service that may be built at a later phase, and then output information about these potential customer locations. As noted above, the different tier of service may comprise different technology, SLA, and/or equipment pricing.

As yet another example, the network-planning engine may identify (and output information about) potential customer locations that may be used as wireless communication mesh network sites to complete and/or expand the wireless communication mesh network and then interact with door-to-door marketing phase 701 if there is a need to complete and/or expand the wireless communication mesh network.

As further shown in FIG. 7A, based on the list of customer locations and mesh network layout, the network-planning engine of planning phase 702 may also interact with a network installation/deployment phase 703 that includes a scheduling engine and an optimization engine to facilitate planning (e.g., on an hourly/daily/weekly basis) schedules of various installation teams involved in various subphases of network installation/deployment phase 703, including electrical installation, line run, antenna mounting, ptp/ptmp node installation, alignment and provisioning, and cluster service activation.

One of ordinary skill in the art will appreciate that FIG. 7A may involve more or less phases and/or sub-phases and that some of the phases and/or sub-phases may be arranged in a different manner.

Figure 7B:
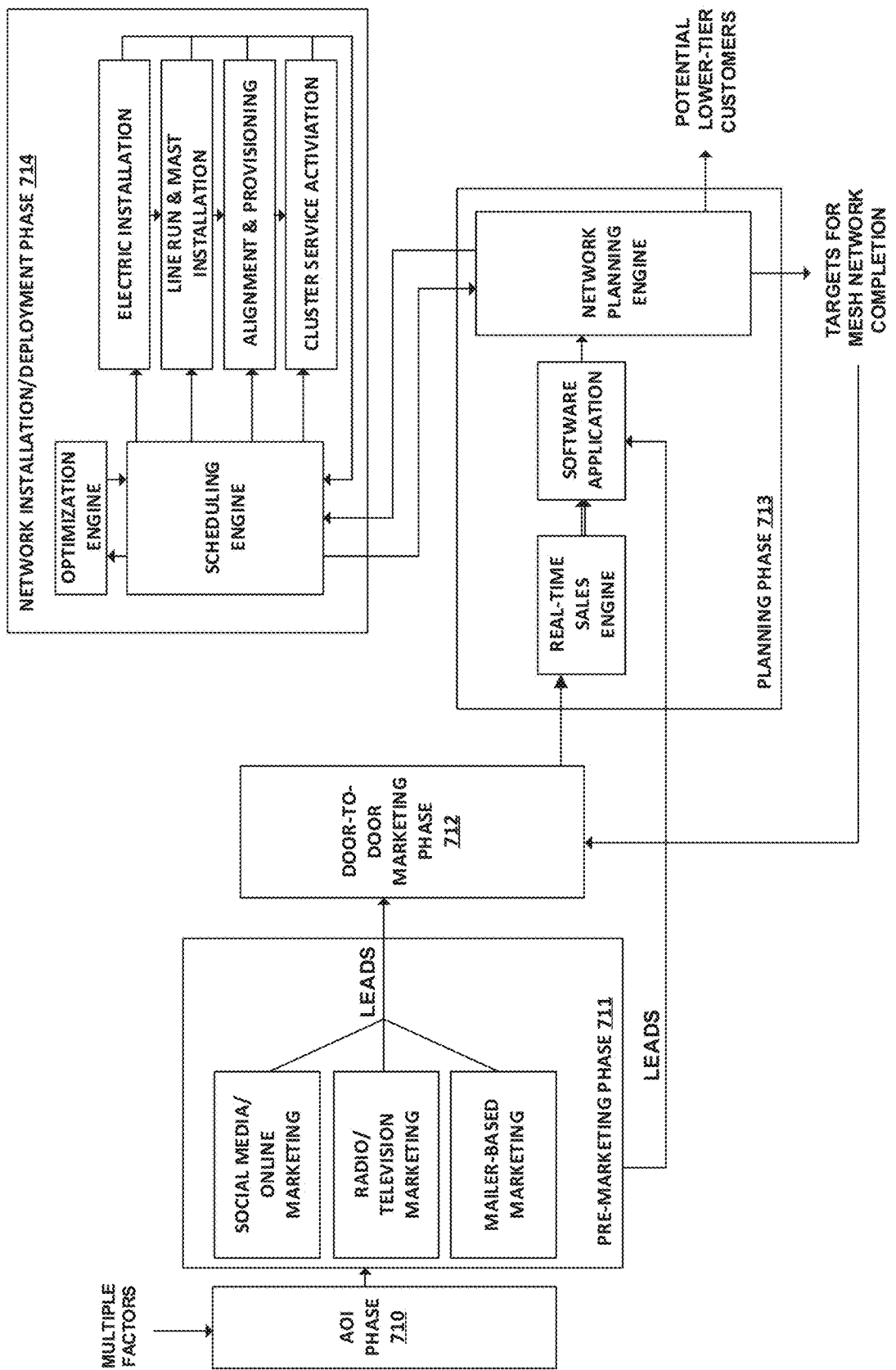
FIG. 7B depicts another example summary level flow diagram for designing and deploying a wireless communication mesh network, in accordance with various aspects of this disclosure.

Referring to FIG. 7B, another example summary-level flow diagram for designing and deploying a wireless communication mesh network is shown to include various phases that have been described above. As above, in practice, each of these phases may be implemented in whole or in part by a computing system, which may comprise a network interface, at least one processor, data storage, and program instructions stored in the data storage that are executable by the at least one processor to perform one or more of the described functions (perhaps based on user input).

As shown, the example flow diagram may begin with an AOI phase 710 that identifies an AOI based on multiple factors described above. Based on the identified AOI, leads for potential customers that have expressed interest in subscribing to a wireless communication mesh network service may be generated at a pre-marketing phase 711 that may include a social media/online marketing sub-phase, radio/television-based marketing sub-phase, and a mailer-based marketing sub-phase.

As further shown in FIG. 7B, the generated leads may be provided to a door-to-door marketing phase 712, which may then interact with a planning phase 713. For instance, during door-to-door marketing phase 712, a door-to-door salesperson may upload information about potential customers who have signed a contractual agreement for the wireless communication mesh network service to a data store that is included within or can otherwise be accessed by a computing system involved in implementing planning phase 702, such that information about the potential customers (e.g., customer location information) can be available to such a computing system. In turn, during planning phase 713, a software application (e.g., a mobile application) may function to (i) obtain information about potential customers that has been generated during door-to-door marketing phase 712 (e.g., information that has been received in real-time) and/or information about potential customers that has been generated during pre-marketing phase 711 and (ii) send such information to a network-planning engine of planning phase 713.

Based on various criteria described above, the network-planning engine of planning phase 713 may then output various information. For example, the network-planning engine may disqualify some potential customers (and/or their corresponding customer locations), select the remaining customers (and/or their corresponding customer locations) for wireless communication mesh network installation/deployment, and then output information about the selected customers. Through a feedback loop, the network-planning engine may also convert a potential customer from a disqualified status to a selected status or vice versa.

As another example, the network-planning engine may select some potential customer locations among those potential customer locations that were not selected for wireless communication mesh network construction for a different tier of service that may be built at a later phase, and then output information about these potential customer locations. As noted above, the different tier of service may comprise different technology, SLA, and/or equipment pricing.

As yet another example, the network-planning engine may identify (and output information about potential customer locations that may be used as wireless communication mesh network sites to complete and/or expand the wireless communication mesh network and then interact with door-to-door marketing phase 712 if there is a need to complete and/or expand the wireless communication mesh network.

As further shown in FIG. 7B, based on the list of customer locations and mesh network layout, the network-planning engine of planning phase 713 may also interact with a network installation/deployment phase 714 that includes a scheduling engine and an optimization engine to facilitate planning (e.g., on an hourly/daily/weekly basis) schedules of various installation teams involved in various sub-phases of network installation/deployment phase 714, including electrical installation, line run, antenna mounting, ptp/ptmp node installation, alignment and provisioning, and cluster service activation.

One of ordinary skill in the art will appreciate that FIG. 7B may involve more or less phases and/or sub-phases and that some of the phases and/or sub-phases may be arranged in a different manner.

In accordance with the present disclosure, the disclosed process for designing and deploying a wireless communication mesh network may take various other forms.

Figure 8:
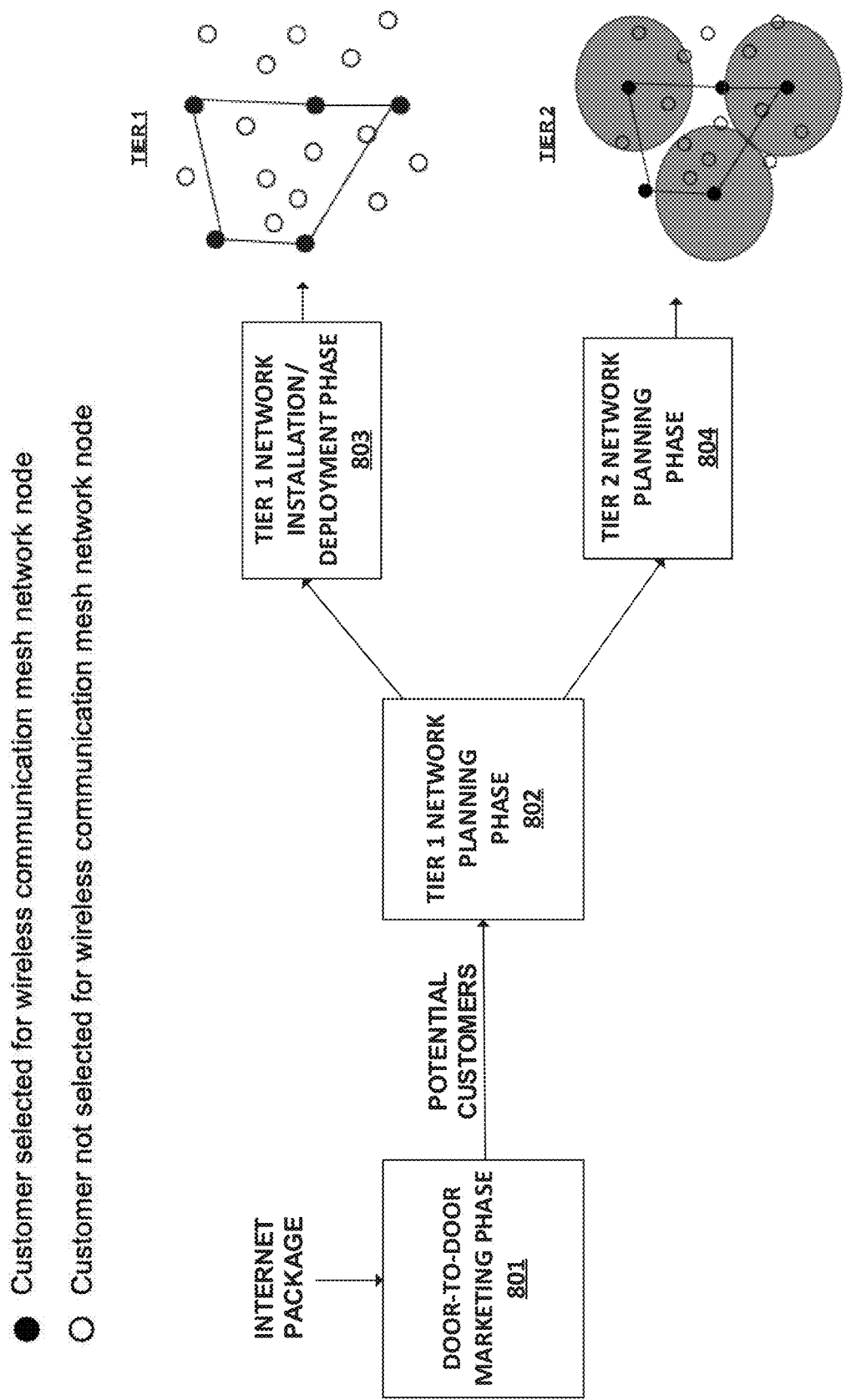
FIG. 8 depicts another example flow diagram for designing and deploying a wireless communication mesh network, in accordance with various aspects of this disclosure.

Referring now to FIG. 8, another example flow diagram for designing and deploying a wireless communication mesh network is shown. As above, in practice, each of the phases shown in FIG. 8 may be implemented in whole or in part by a computing system, which may comprise a network interface, at least one processor, data storage, and program instructions stored in the data storage that are executable by the at least one processor to perform one or more of the described functions (perhaps based on user input).

As shown in FIG. 8, information about an internet package, such as details regarding an internet service of the wireless communication mesh network (e.g., the uplink and downlink speed ranges, pricing, contract term, and/or options for bundling with other services, among other details), may be used for marketing at a marketing phase 801. In this respect, marketing phase 801 may comprise a pre-marketing phase and/or a door-to-door marketing phase that results in a list of potential customers for the wireless communication mesh network service. The potential customers may then be provided to a network-planning engine of a tier-1 network planning phase 802 as shown in FIG. 8, which may take a form similar to the network-planning engine described above with respect to FIGS. 7A-7B.

After the network-planning engine of tier-1 network planning phase 802 identifies customers and/or corresponding customer locations for construction of tier 1 of the wireless communication mesh network and outputs information about the identified customers/locations, installation and deployment of tier 1 of the wireless communication mesh network may then take place during a tier-1 network installation/deployment phase 803. As shown in FIG. 8, solid black circles represent potential customer locations that were selected as tier-1 wireless communication mesh network nodes during tier-1 network planning phase 802 and white circles represent potential customer locations that were not selected as tier-1 wireless communication mesh network nodes during tier-1 network planning phase 802.

In some instances, the SLA and pricing model for these customer locations selected as tier-1 wireless communication mesh network nodes may be different than the advertised internet package details from the internet package phase. For example, customer locations selected as tier-1 wireless communication mesh network nodes may be offered higher uplink and downlink speeds at a lower monthly fee or no monthly fee. In some instances, internet service fees may be waived or lowered only if customer locations selected as wireless communication mesh network nodes choose a bundled package that include other services, such as a smart home security service or a solar energy service. In other instances, the SLA and pricing model for these customer locations selected as tier-1 wireless communication mesh network nodes may remain unchanged from the advertised internet package details from the internet package phase.

Further, during a tier-2 network planning phase 804, some of the customer locations selected as tier-1 wireless communication mesh network nodes (represented by the solid black circles) may further be selected to provide a backbone for a wireless communication mesh network that has the capability to provide a different tier of services (e.g., "tier 2") to other customer locations that were not selected as tier-1 wireless communication mesh network nodes during tier-1 network planning phase 802 (represented by the white circles). In turn, additional hardware may be added to these customer locations in order to design and deploy such a wireless communication mesh network. As shown in FIG. 8, in some embodiments, the additional hardware may provide an omni-directional coverage area for the different tier of services. In other embodiments, the additional hardware may provide a directional (e.g., 45-degree, 90-degree, 120-degree sector) coverage area for the different tier of services.

Based on the coverage area, at least some of the potential customer locations that were not selected as tier-1 wireless communication mesh network nodes (represented by white circles) may then be offered the different tier of services (e.g., "tier 2") by installing wireless network equipment at their corresponding customer locations that are compatible with the wireless communication mesh network technology of the different tier, such as 4G LTE/LTE-Advanced, or Wi-Fi Aps. In one embodiment, the SLA and pricing for these tier-2 customers (represented by white circles) may be the same as the internet package details from the internet package phase. In another embodiment, the SLA and pricing for these customers may be different than the internet package details from the internet package phase.

Figure 9:
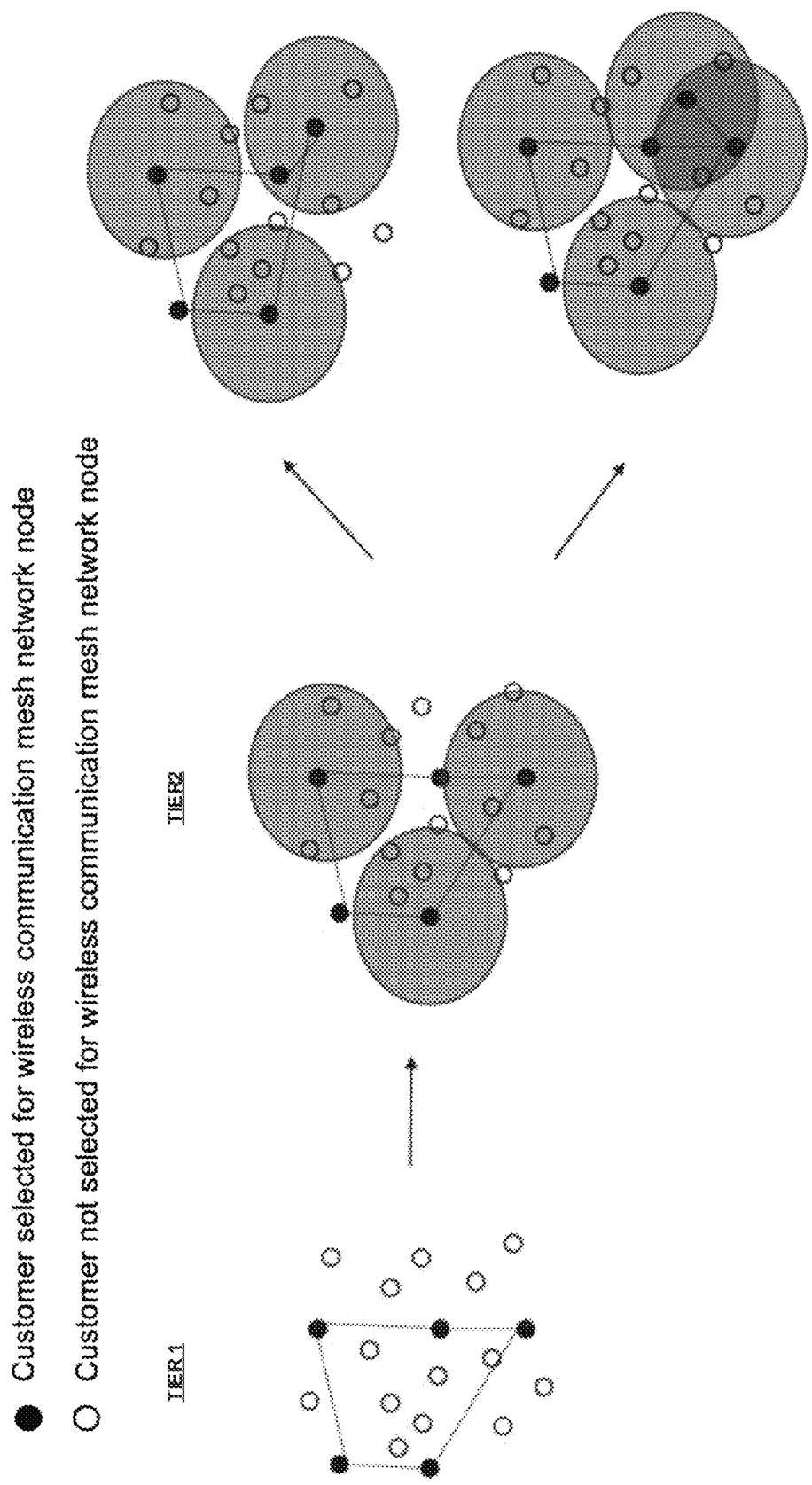
FIG. 9 depicts an example coverage area of a wireless communication mesh network as customers are added or removed, in accordance with various aspects of this disclosure.

In practice, these tier-2 customers may be added to the wireless communication mesh network by adding wireless communication mesh network node equipment and creating ptp/ptmp links to connect the equipment to existing nodes of the wireless communication mesh network. Generally speaking, these tier-2 customers may be added to a wireless communication mesh network under various circumstances as illustrated in FIG. 9. For example, it is possible that an existing customer location selected as a tier-1 wireless communication mesh network node may unsubscribe from the wireless communication mesh network, which may cause the cover area for the different tier of services to change. As another example, it may be desirable to increase the coverage area of the wireless communication mesh network and/or expand the use of the tier-2 wireless communication mesh network technology by adding more tier-2 customers to the wireless communication mesh network. As yet another example, it may be desirable to increase the number of wireless communication mesh network customers. These tier-2 customers may be added to a wireless communication mesh network under various other circumstances as well.

In practice, for wireless communication mesh networks described above, private infrastructure, such as a single-family home rooftop may be used for deployment of wireless communication mesh network equipment (including antennas, antenna mounts, radios, cables, etc.) for ptp/ptmp links and wireless/cellular communication network small cells and CPEs. In this respect, the location on the rooftop where the communication network equipment is mounted can be very important. While field technicians and installers do their best to ensure no damage to the rooftop where the equipment are installed, the process of installing the equipment (e.g., drilling) may cause some possible damage to the rooftop in the longer run. In this respect, if the rooftop area selected for wireless network equipment installation is above a living area (e.g., a living room, bedroom, attic) or any other area, the liability of a network operator may be greatly increased by any damage caused by the installation. Accordingly, choosing an area of a roof for equipment installation that is not above any living space may greatly reduce the liability of a network operator that uses private infrastructure for network installation/deployment.

Figure 10:
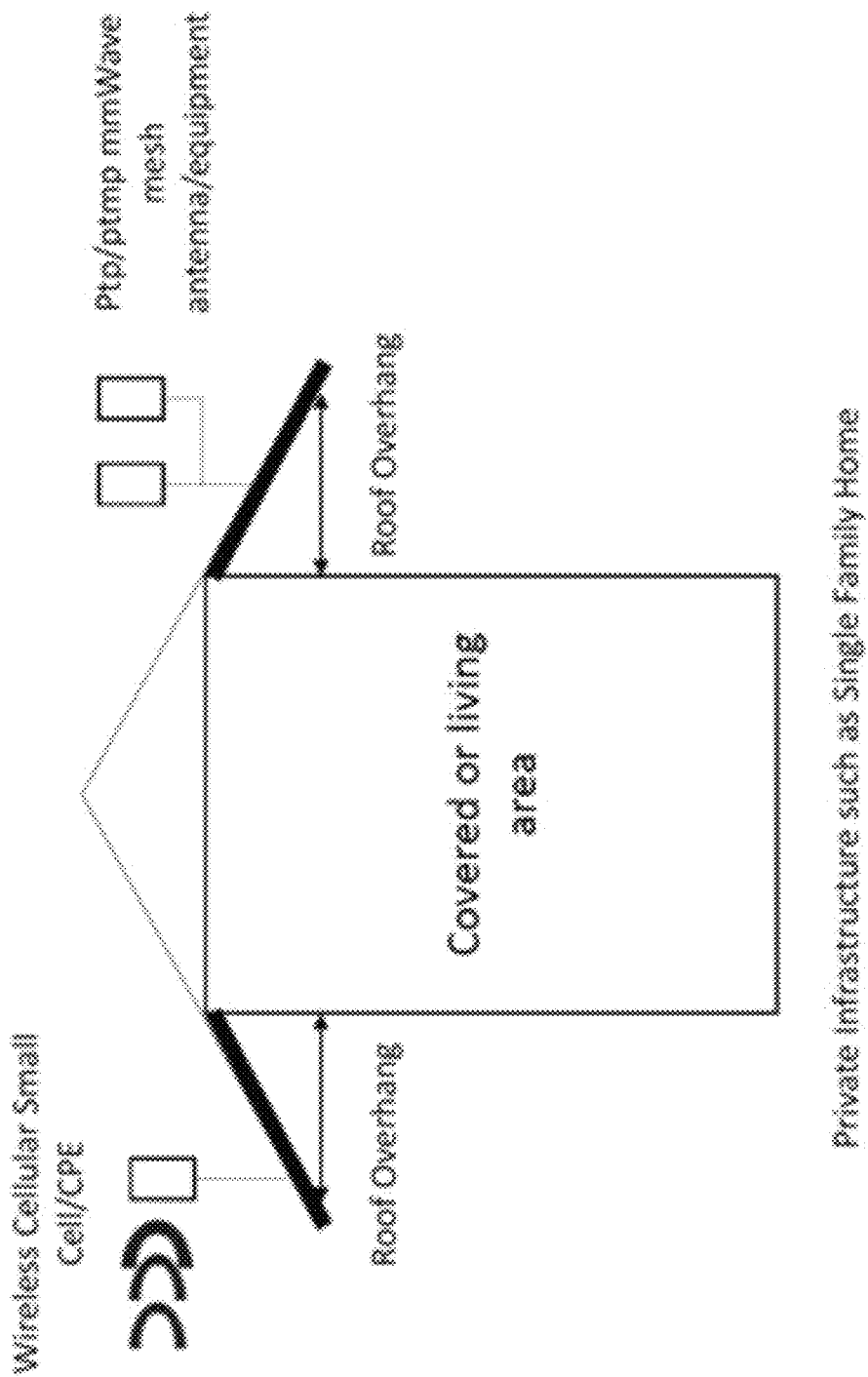
FIG. 10 depicts an example private infrastructure in which wireless communication mesh network equipment may be installed, in accordance with various aspects of this disclosure.

One such area may be the roof overhangs as shown in the FIG. 10. As shown, all wireless communication mesh network equipment may be installed on roof overhangs, and thus, any potential roof damage from installation is unlikely to impact a living area of a private infrastructure, such as a single-family home, and significantly reduce a wireless operator's liability.

In accordance with the present disclosure, a network-planning engine described above may use various criteria described above for selecting customers for the wireless communication mesh network and outputting information about the selected customers such that wireless communication mesh network nodes can be installed/deployed at the selected customer locations. In particular, the LOS profile may be an important criteria for designing and deploying a wireless communication mesh network to ensure that every wireless communication mesh network node (and the equipment on every rooftop) has a direct LOS path with other existing and future wireless communication mesh network nodes (neighbor sites), since wireless signals suffer very high level of attenuation if encountered with vegetation and/or buildings and ptp/ptmp links may drop due to weak signal levels.

In general, a LOS profile is dependent on the area of roof selected for LOS analysis. For example, one node can have a perfect LOS path to an existing (or future) neighbor node equipment from the highest point of the roof (which is typically above a living area) and may not have a LOS path to the same neighbor node equipment if the equipment is moved to a different section of the roof such as the roof overhangs as described above with respect to FIG. 10. In this respect, a customer home selected as a wireless communication mesh network node by installing equipment on top of the customer home's roof for setting up ptp/ptmp links may later cause large liability issues for a network operator.

Thus, in one embodiment, the network-planning engine of a planning phase (which has been described above) may select customer homes that have a good LOS profile with other wireless communication mesh network nodes from an area of a roof that is not directly above any living area and reject potential customers that do not have a good LOS profile with other wireless communication mesh network nodes (including existing and future/planned nodes) from the area the roof that is not directly above any living area. As described above with respect to FIG. 10, the area of the roof that is not directly above any living area may comprise the roof overhang. In some embodiments, the area of the roof that is not directly above any living area may comprise a different area other than the roof overhang as well.

In another aspect, disclosed herein are systems and methods for constructing a wireless communication mesh network node for a wireless communication mesh network. Generally speaking, a wireless communication mesh network may take various forms.

Figure 11:
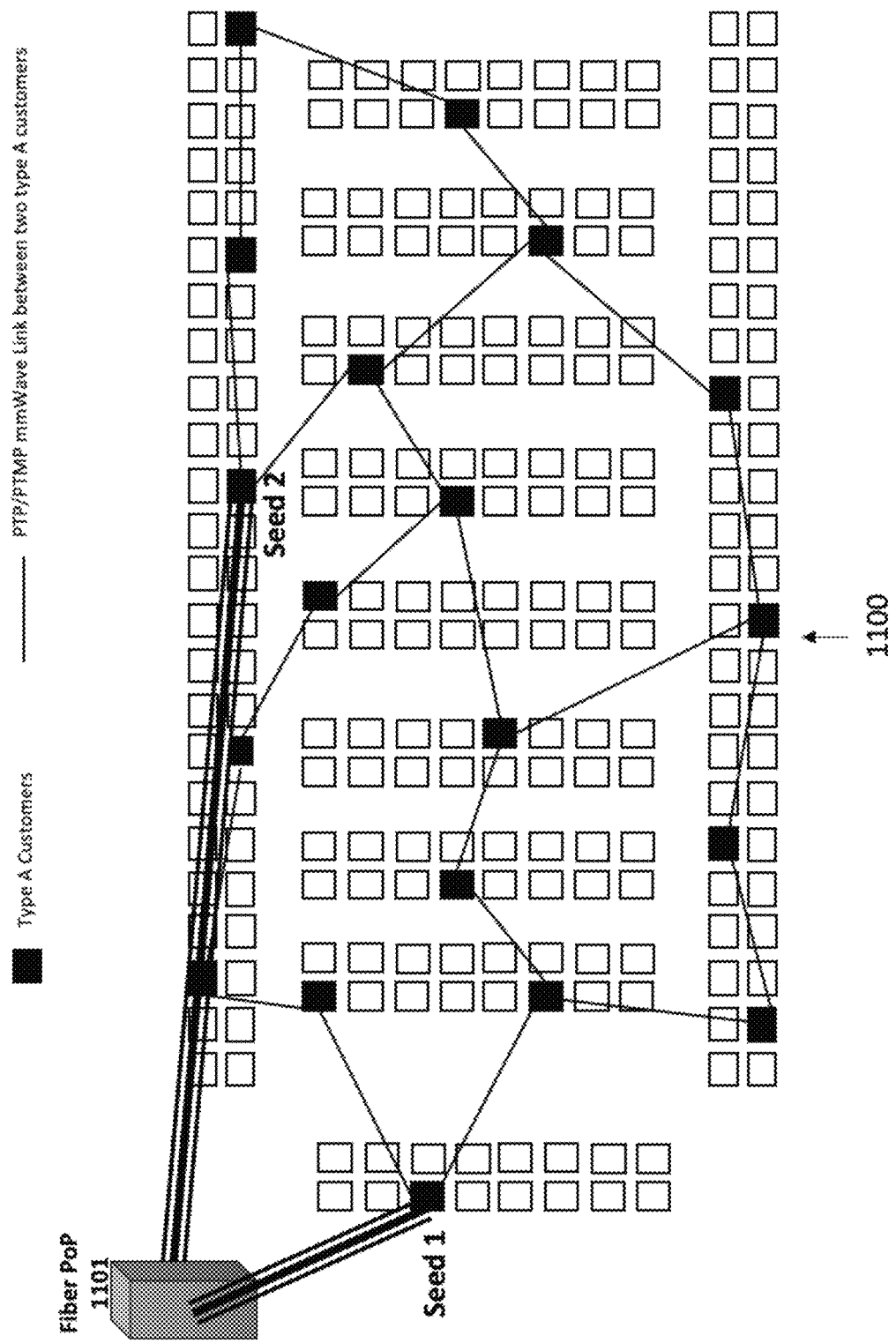
FIG. 11 depicts an example diagram of a wireless communication mesh network, in accordance with the present disclosure.

To illustrate, FIG. 11 depicts an example wireless communication mesh network 1100 that includes ptp/ptmp wireless communication links. As shown, wireless communication mesh network 1100 has a fiber Point of Presence ("PoP") 1101 that represents a location with fiber or very-high-capacity backbone communication links to a CORE network or data center. Fiber PoP 1101 may also represent a location that is high enough to provide line-of-sight to a large surrounding area.

As further shown in FIG. 11, fiber PoP 1101 may have two high capacity narrow beam width nodes that are capable of establishing two ptp/ptmp high capacity bi-directional communication links between fiber PoP 1101 and seed nodes 1 and 2. All wireless communication mesh network nodes are represented by solid black squares and white squares represent homes in a neighborhood that are not selected (at least initially) as part of wireless communication mesh network 1100. Generally speaking, each seed node 1 and 2 is a special wireless communication mesh network node that can host at least two types of communication equipment; one for supporting ptp/ptmp mmWave wireless communication links (represented in thin black lines) with other wireless communication mesh network nodes called "type A customer nodes," and another for supporting high capacity ptp/ptmp mmWave communication links (represented in triple compound lines) with fiber PoP 1101 to provide connectivity to a CORE network.

It should be understood that while wireless communication mesh network 1100 shows two seed homes (e.g., "Seed 1" and "Seed 2") connected to fiber PoP 1101 via high capacity ptp/ptmp mmWave communication links, wireless communication mesh network 1100 may include any number of seed homes connected to fiber PoP 1101. It should also be understood that wireless communication mesh network 1100 may include any number of type A customer nodes connected to wireless communication mesh network 1100 via ptp/ptmp mmWave wireless communication links.

In practice, wireless communication mesh network equipment (e.g., antennas, RF and digital circuitry, routers, switches, etc.) deployed on a wireless communication mesh network node (e.g., a type A customer node or seed home) may be powered using the same power source that provides power to the home hosting the wireless communication mesh network node. In some instances, there may be a backup power supply that can provide power for the wireless communication mesh network node for some time (e.g., 1-2 hours) in the event of a power outage to a home hosting the wireless communication mesh network node.

Figure 12:
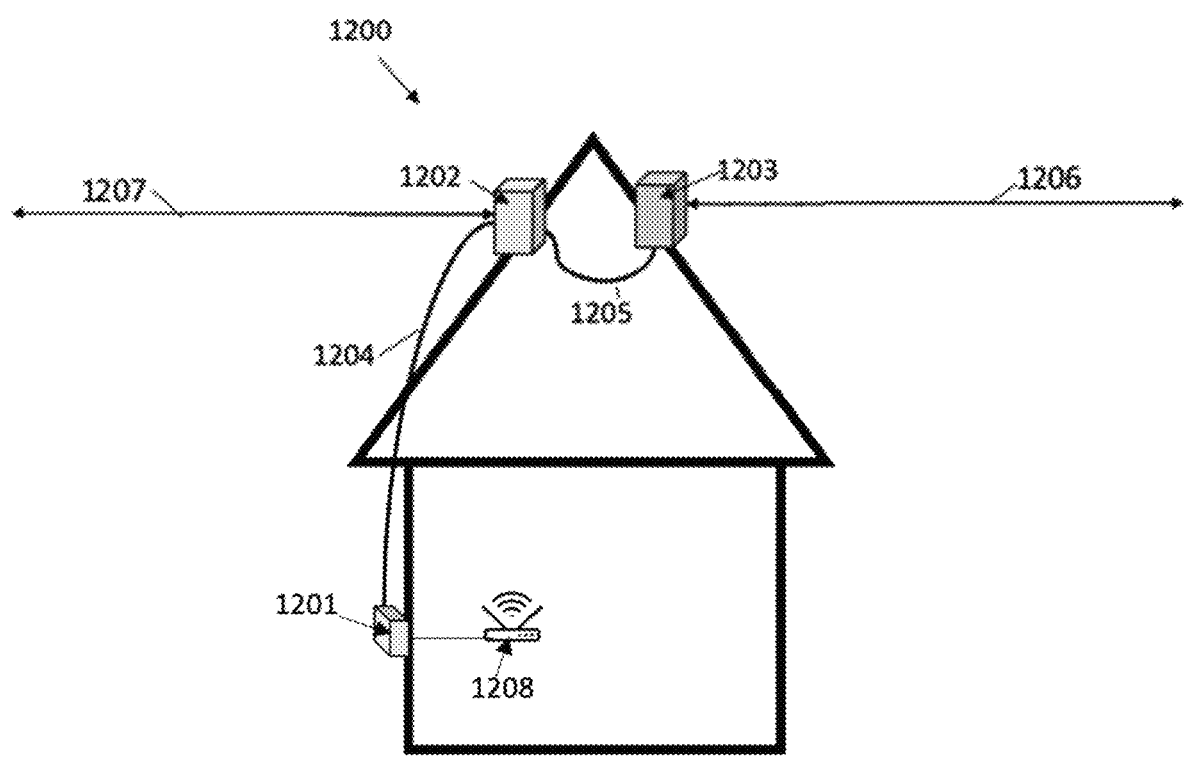
FIG. 12 depicts an example design of a wireless communication mesh network node that includes a power supply box, in accordance with the present disclosure.

A given wireless communication mesh network node of a wireless communication mesh network may take various forms. To illustrate, FIG. 12 depicts an example type A customer node 1200 that may be constructed at a given customer's home (e.g., one of the homes represented in a solid black square in FIG. 11). The construction of type A customer node 1200 may involve various phases.

As one possibility, construction of type A customer node 1200 may involve a phase for conducting a site survey. For instance, a site survey may be conducted to check a line-of-sight profile between type A customer node 1200 and other neighboring nodes to ensure bi-directional communication links that form part of the wireless mesh communication network can be established. As one particular example, a site survey may be conducted to check a line-of-sight profile between type A customer node 1200 and a neighboring type A customer node (not shown in FIG. 12) in a direction represented by bi-directional link 1207 and/or check a line-of sight profile between type A customer node 1200 and another neighboring type A customer node (not shown in FIG. 12) in the direction represented by bi-directional link 1206. In some instances, a site survey may be conducted to validate a certain minimum signal threshold for line-of-sight connectivity between type A customer node 1200 and a neighboring node instead of validation based on strict line-of-sight connectivity.

As another possibility, construction of type A customer node 1200 may involve a phase for outdoor installation of wireless communication mesh network radios 1202 and 1203. In one embodiment, outdoor installation of wireless mesh network radios 1202 and 1203 may take place on the roof of a home using one or more antenna mounts. It should be understood, however, that installation of wireless mesh network radios 1202 and 1203 may take place at a different outdoor location other than a home as well.

As still another possibility, construction of type A customer node 1200 may involve a phase for installing power supply box 1201, which may be attached to the outside exterior wall or inside exterior wall of a customer's home. To install power supply box 1201, the construction may involve running one or more cables from wireless communication mesh network radio 1202 and/or 1203 to power supply box 1201 to provide power to wireless communication mesh network radios 1202 and/or 1203 and possibly carry data between a customer router 1208 and the data center of the wireless communication mesh network. For instance, as shown, wireless communication mesh network radios 1202 and 1203 may be interconnected via cable 1205, and power supply box 1201 and wireless communication mesh network radios 1202 and 1203 may be interconnected via cable 1204 in order to provide power to wireless communication mesh network radios 1202 and 1203.

In practice, depending on the distance between power supply box 1201 and wireless communication mesh network radios 1202 and 1203, this phase involving installing power supply box 1201 and powering wireless communication mesh network radios 1202 and 1203 may represent one of the more time consuming phases for constructing a wireless communication mesh node such as type A customer node 1200.

As yet another possibility, construction of type A customer node 1200 may involve a phase for alignment and configuration of wireless communication mesh network radios 1202, 1203 to establish line-of-sight communication links (e.g., link 1206 and/or link 1207) with neighboring wireless mesh network node radios.

As a further possibility, construction of type A customer node 1200 may involve a phase for installing customer router 1208 and activating network services (e.g., high-speed Internet service).

It should be understood that the phases for constructing a wireless communication mesh network node such as type A customer node 1200 may take various other forms as well. For instance, construction of type A customer node 1200 may involve more or less phases than the example phases described above, and each phase may involve one or more intermediary steps.

Further, it should be understood that type A customer node 1200 may take various other forms as well. For example, type A customer node 1200 may have any number of ptp and/or ptmp communication links, any number of wireless communication mesh network radios, and any number of cables interconnecting and powering the wireless communication mesh network radios. As another example, while FIG. 12 is described with respect to type-A customer node 1200, other types of wireless communication mesh network nodes (e.g., a seed home) may be constructed in a similar fashion.

Figure 13:
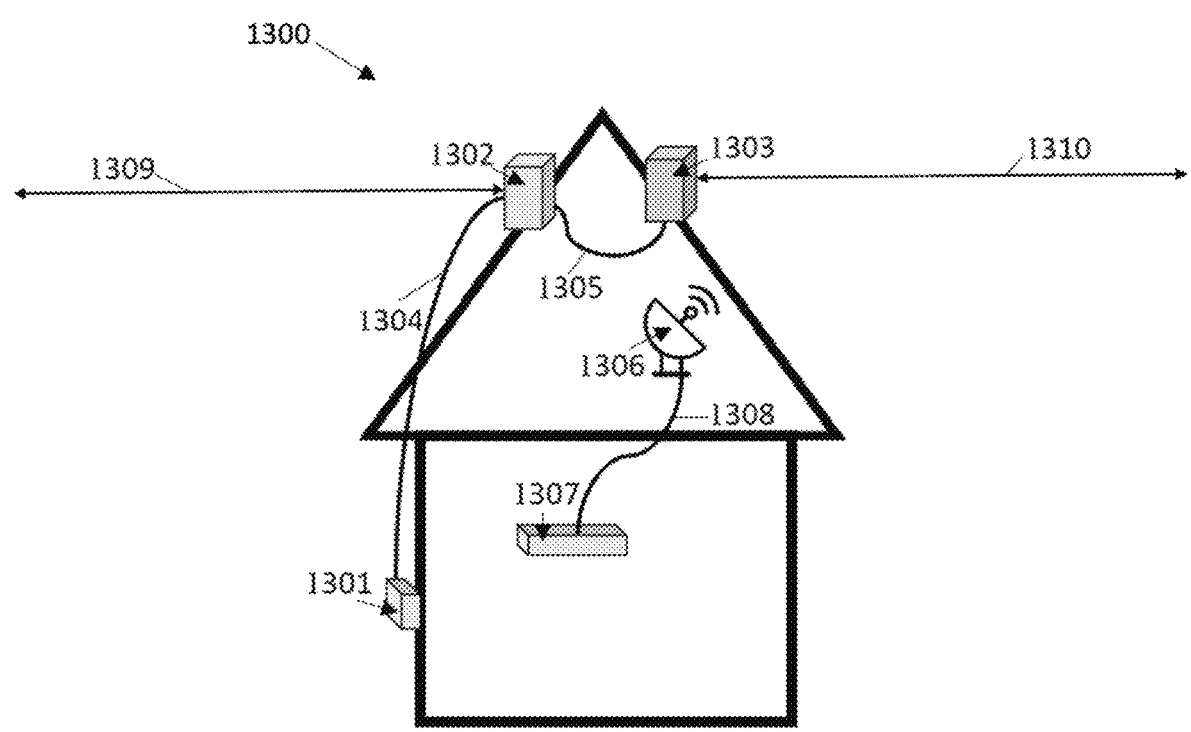
FIG. 13 depicts another example design of wireless communication mesh network node, in accordance with the present disclosure.

A given wireless communication mesh network node of a wireless communication mesh network may take various other forms as well. To illustrate another example, FIG. 13 depicts an example wireless communication mesh network node 1300 that may be constructed at a given customer's home (e.g., one of the homes represented in a solid black square in FIG. 11). The construction of wireless communication mesh network node 1300 may involve various phases.

As one possibility, wireless communication mesh network node 1300 may involve a phase for conducting a site survey. For instance, a site survey may be conducted to check a line-of-sight profile between wireless communication mesh network node 1300 and other neighboring nodes to ensure bi-directional communication links that form part of the wireless mesh communication network can be established. As one particular example, a site survey may be conducted to check a line-of-sight profile between wireless communication mesh network node 1300 and a neighboring wireless communication mesh network node (not shown in FIG. 13) in a direction represented by bi-directional link 1309 and/or check a line-of sight profile between wireless communication mesh network node 1300 and another neighboring wireless communication mesh network node (not shown in FIG. 13) in the direction represented by bi-directional link 1310. In some instances, a site survey may be conducted to validate a certain minimum signal threshold for line-of-sight connectivity between wireless communication mesh network node 1300 and a neighboring node instead of validation based on strict line-of-sight connectivity.

As another possibility, wireless communication mesh network node 1300 may involve a phase for outdoor installation of wireless communication mesh network radios 1302 and 1303. In one embodiment, outdoor installation of wireless mesh network radios 1302 and 1303 may take place on the roof of a home using one or more antenna mounts. It should be understood, however, that installation of wireless mesh network radios 1302 and 1303 may take place at a different outdoor location other than a home as well.

As still another possibility, construction of wireless communication mesh network node 1300 may involve a phase for installing power supply box 1301, which may be attached to the outside exterior wall or inside exterior wall of a customer's home. To install power supply box 1301, the construction may involve running one or more cables from wireless communication mesh network radio 1302 and/or 1303 to power supply box 1301 to provide power to wireless communication mesh network radios 1302 and/or 1303. For instance, as shown, wireless communication mesh network radios 1302 and 1303 may be interconnected via cable 1305, and power supply box 1301 and wireless communication mesh network radios 1302 and 1303 may be interconnected via cable 1304 in order to provide power to wireless communication mesh network radios 1302 and 1303.

In some instances, as shown in FIG. 13, wireless communication mesh network node 1300 may also comprise a satellite dish 1306 that is coupled to a cable set top box 1307 via coaxial cable 1308 (or some other satellite dish compatible cable). Cable set top box 1307 may provide power to the low noise block down-converter ("LNB") of satellite dish 1306 via coaxial cable 1308.

In practice, installation of wireless communication mesh network radios 1302 and 1303 may take place some time after satellite dish 1306 and cable set top box 1307 have been installed. It should be understood, however, installation of wireless communication mesh network radios 1302 and 1303 can take place some time before satellite dish 1306 and cable set top box 1307 have been installed as well. In this respect, installation of wireless communication mesh network radios 1302 and 1303 may take place independent of the installation of satellite dish 1306 and cable set top box 1307.

It should be understood that the phases for constructing a wireless communication mesh network node such as wireless communication mesh network node 1300 may take various other forms. It should also be understood that wireless communication mesh network node 1300 may take various other forms as well.

Figure 14:
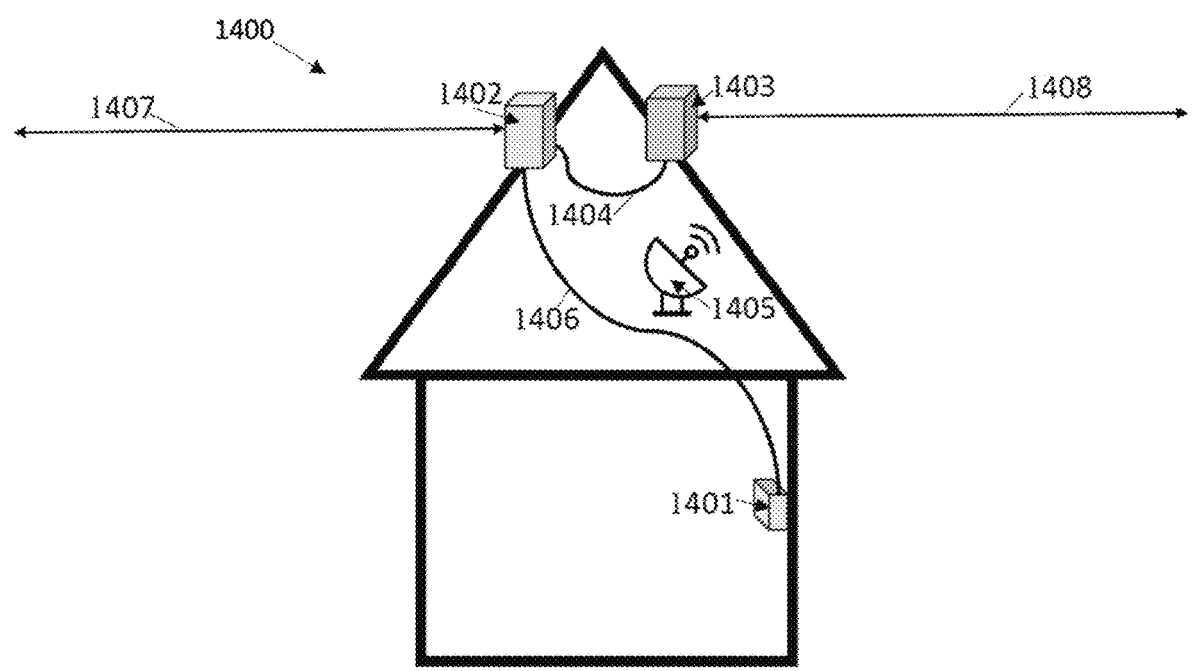
FIG. 14 depicts yet another example design of wireless communication mesh network node, in accordance with the present disclosure.

A given wireless communication mesh network node of a wireless communication mesh network may take various other forms as well. To illustrate yet another example, FIG. 14 depicts an example wireless communication mesh network node 1400 that may take the form similar to wireless communication mesh network node 1300. The construction of wireless communication mesh network node 1400 may involve various phases similar to the construction of wireless communication mesh network node 1300. However, instead of a completely independent construction of a wireless communication mesh network node, an existing cable (e.g. coaxial cable 1406) from a satellite dish (e.g., satellite dish 1405) and/or a cable set top box (or some other existing radio) is used to connect wireless mesh network radios (e.g., wireless mesh network radios 1402 and 1403) to a power supply box (e.g., power supply box 1401).

In particular, as one possibility, similar to the construction of wireless communication mesh network node 1300, the construction of wireless communication mesh network node 1400 may involve a phase for conducting a site survey. For instance, a site survey may be conducted to check a line-of-sight profile between wireless communication mesh network node 1400 and other neighboring nodes to ensure bi-directional communication links that form part of the wireless mesh communication network can be established. As one particular example, a site survey may be conducted to check a line-of-sight profile between wireless communication mesh network node 1400 and a neighboring wireless communication mesh network node (not shown in FIG. 14) in a direction represented by bi-directional link 1407 and/or check a line-of sight profile between wireless communication mesh network node 1400 and another neighboring wireless communication mesh network node (not shown in FIG. 14) in the direction represented by bi-directional link 1408. In some instances, a site survey may be conducted to validate a certain minimum signal threshold for line-of-sight connectivity between wireless communication mesh network node 1400 and a neighboring node instead of validation based on strict line-of-sight connectivity.

As another possibility, wireless communication mesh network node 1400 may involve a phase for outdoor installation of wireless communication mesh network radios 1402 and 1403. In one embodiment, outdoor installation of wireless mesh network radios 1402 and 1403 may take place on the roof of a home using one or more antenna mounts. It should be understood, however, that installation of wireless mesh network radios 1402 and 1403 may take place at a different outdoor location other than a home as well.

As still another possibility, construction of wireless communication mesh network node 1400 may involve a phase for installing power supply box 1401, which may be attached to the inside exterior wall of a customer's home. To install power supply box 1401, the construction may involve running one or more cables from wireless communication mesh network radio 1402 and/or 1403 to power supply box 1401 to provide power to wireless communication mesh network radios 1402 and/or 1403. For instance, as shown, wireless communication mesh network radio 1402 may be interconnected via cable 1404, and power supply box 1401 and wireless communication mesh network radio 1402 may be interconnected via a coaxial cable 1406 in order to provide power to wireless communication mesh network radio 1402 and wireless communication mesh network radio 1403 (which is daisy-chained to wireless communication mesh network radio 1402 via cable 1404). In one embodiment, coaxial cable 1406 may be a pre-existing cable that was previously used to connect a cable setup top box (e.g., cable setup top box 1307) to satellite dish 1405.

As yet another possibility, construction of wireless communication mesh network node 1400 may involve a phase for installing a router in the customer's home. For instance, a cable may be used to interconnect the customer's router (not shown) to power supply box 1401, which in turn may enable coaxial cable 1406 to carry data from the customer's home. In this respect, coaxial cable 1406 may not only provide power to wireless communication mesh network radio 1402 (and wireless communication mesh network radio 1403 that is daisy-chained to wireless communication mesh network radio 1402 via cable 1404) but also provide data connectivity to end users (e.g., customers).

It should be understood that while FIG. 14 illustrates an embodiment where coaxial cable 1406 is directly coupled to wireless communication mesh network radio 1402 and indirectly coupled to wireless communication mesh network radio 1403 (via cable 1404), in a different embodiment, coaxial cable 1406 may provide power to both wireless communication mesh network radios 1402 and 1403 by using a cable splitter and/or switch. The cable splitter and/or switch may also be used if coaxial 1406 is needed to power both wireless communication mesh network radios 1402 and 1403 and satellite dish 1405.

Further, it should be understood that while FIG. 14 illustrates an embodiment where wireless communication mesh network radios 1402 and 1403 each comprise a coaxial interface, in a different embodiment where wireless communication mesh network radios 1402 and 1403 do not have coaxial interfaces, a cable adaptor may be used to convert the power interface of each wireless communication mesh network radio to a compatible interface needed to couple coaxial cable 1406 to wireless communication mesh network radios 1402 and 1403.

The construction of wireless communication mesh network node 1400 may involve various other phases and wireless communication mesh network node 1400 may take various other forms as well. For instance, while FIG. 14 shows a wireless communication mesh network node that includes only two wireless communication mesh network radios and one satellite dish, wireless communication mesh network node 1400 may include any number of radios and/or satellite dishes.

Figure 15:
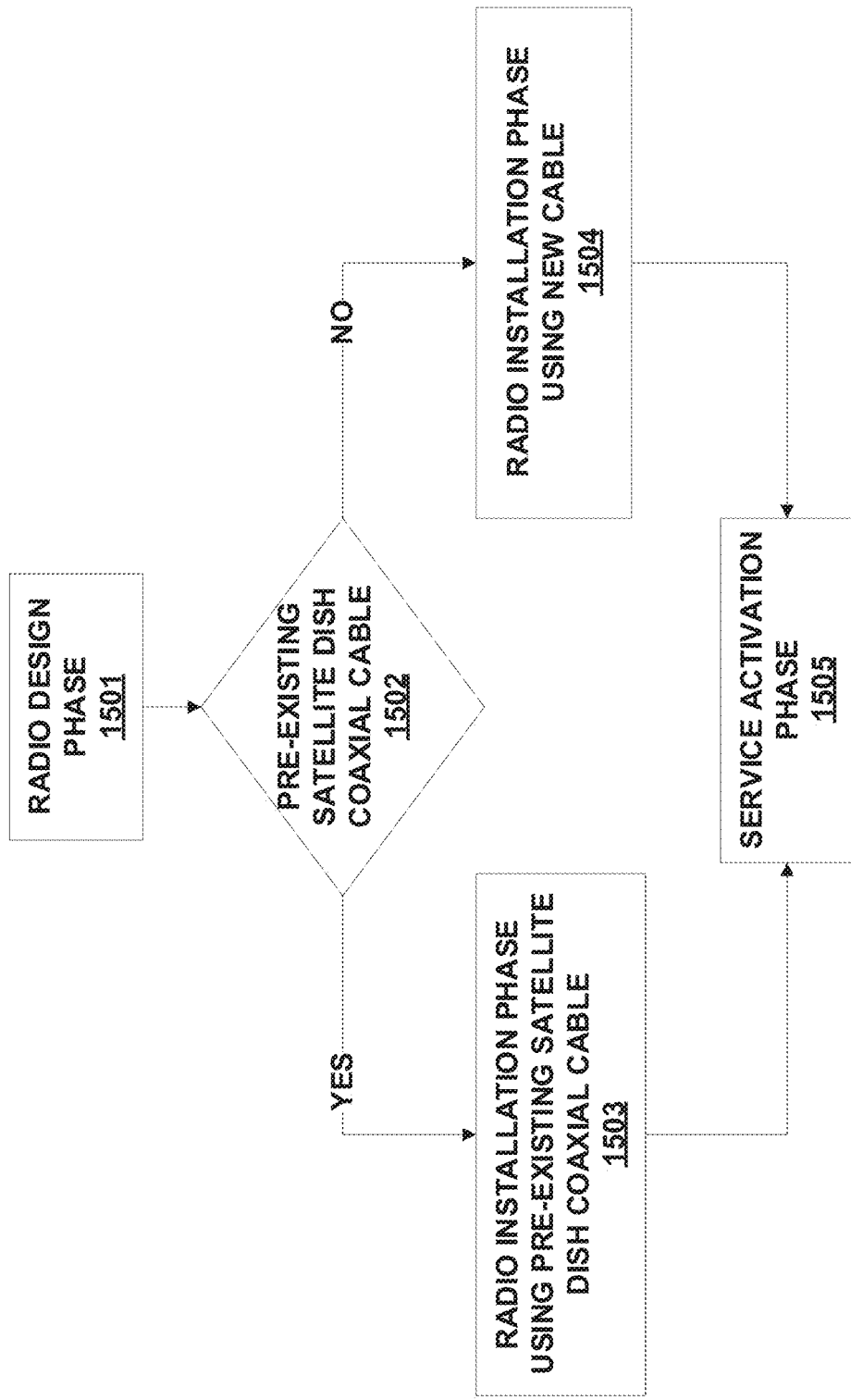
FIG. 15 depicts an example flow diagram for constructing a wireless communication mesh network node, in accordance with the present disclosure.

Turning to FIG. 15, an example flow diagram for constructing a wireless communication mesh network node (e.g., wireless communication mesh network node 1400 of FIG. 14) is shown. At block 1501, the construction may involve a radio design phase. The radio design phase may involve adding a coaxial interface to each of the wireless communication mesh network radios (e.g., wireless communication mesh network radios 1402 and 1403) in order to power the wireless communication mesh network radios via a coaxial cable (e.g., coaxial cable 1406) or some other compatible cable. In some instances, an adaptor may be used to covert the existing power interface (e.g., PoE or USB interface) of each wireless communication mesh network radio to a coaxial interface.

At block 1502, the construction may involve a determination of whether the wireless communication mesh network node location (e.g., a customer's home) includes a pre-existing satellite dish cable (e.g., coaxial cable 1406) that may be used to power each of the wireless communication mesh network radios.

If the wireless communication mesh network node location does include a pre-existing satellite dish cable, at block 1503, the construction of the wireless communication mesh network node may involve a radio installation phase using the pre-existing satellite dish cable (e.g., coaxial cable 1406). For example, as described above, the power interface of a first wireless communication mesh network radio (e.g., wireless communication mesh network radio 1402) may be connected to the pre-existing satellite dish cable (e.g., coaxial cable 1406) and a second wireless communication mesh network radio (e.g., wireless communication mesh network radio 1403) may be daisy-chained to the first wireless communication mesh network radio. As another example, power interface of a first wireless communication mesh network radio (e.g., wireless communication mesh network radio 1402) may be connected to the pre-existing satellite dish cable (e.g., coaxial cable 1406) using a cable splitter and/or switch (e.g., a first output of the cable splitter and/or switch), and a second wireless communication mesh network radio (e.g., wireless communication mesh network radio 1403) may also be connected to the pre-existing satellite dish cable (e.g., coaxial cable 1406) using the cable splitter and/or switch (e.g., a second output of the cable splitter and/or switch). In instances where an existing satellite dish (e.g., satellite dish 1405) is not in use, then the existing satellite dish can be left unplugged (e.g., coaxial cable 1406 may be left disconnected from satellite dish 1405). In other instances where an existing satellite dish (e.g., satellite dish 1405) is in use, then a switch (e.g., a Multimedia over Coax Alliance ("MoCA") switch) may be used to interconnect and power both the wireless communication mesh network radios and the existing satellite dish.

In practice, powering wireless communication mesh network radios using a pre-existing satellite dish cable (e.g., coaxial cable 1406) may result in a significant reduction in costs (e.g., operating expenses) for a wireless communication mesh network operator.

On the other hand, if the wireless communication mesh network node location does not include a pre-existing satellite dish cable, at block 1504, the construction of the wireless communication mesh network node may involve a radio installation phase using a new cable. For instance, a new cable (e.g., a new coaxial cable or other power cable) may be connected to a wireless communication mesh network radio (e.g., wireless communication mesh network radio 1302) to power the wireless communication mesh network radio.

At block 1505, the construction of the wireless communication mesh network node may involve a service activation phase to complete the construction. For instance, the service activation phase may involve connecting the pre-existing satellite dish cable (e.g., coaxial cable 1406) or a new cable to a power supply box (e.g., power supply box 1301 or 1401). The service activation phase may also involve installing and configuring a customer's router for the wireless communication mesh network and activating a network service, such as a high-speed Internet service.

It should be understood that the phases for constructing the wireless communication mesh network node may take various other forms, and the construction of the wireless communication mesh network node may take various different forms as well. For instance, the construction may involve more or less phases than the phases described above with respect to FIG. 15.

Figure 16:
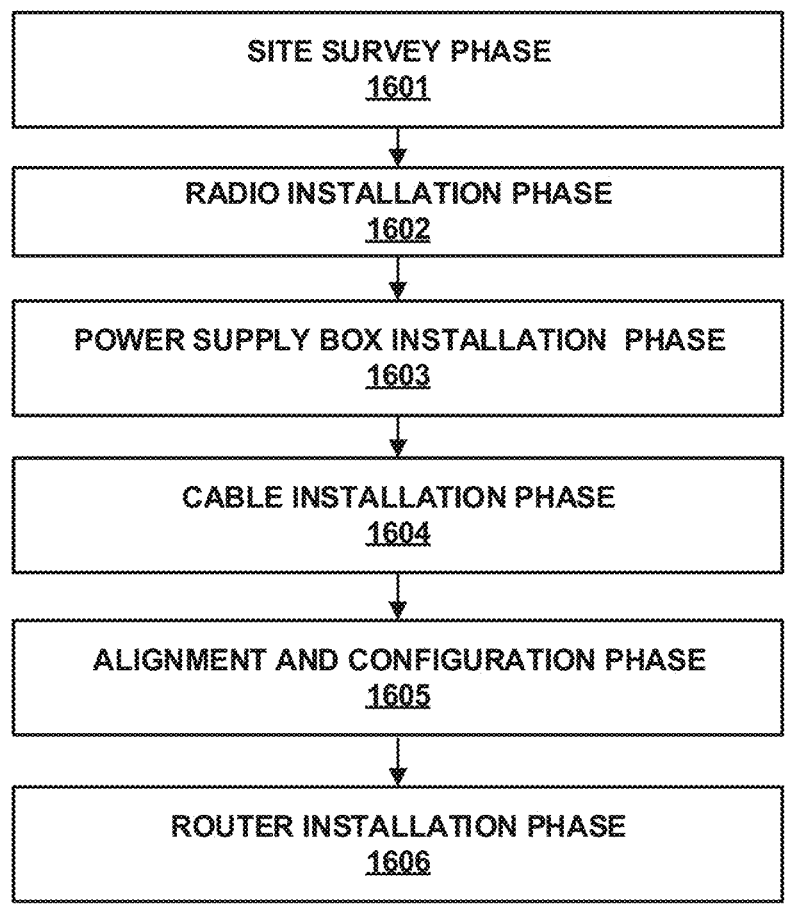
FIG. 16 depicts another example flow diagram for constructing a wireless communication mesh network node, in accordance with the present disclosure.

Turning to FIG. 16, another example flow diagram for constructing a wireless communication mesh network node (e.g., type-A customer node 1200 of FIG. 12) is shown. At block 1601, constructing the wireless communication mesh network node may involve a site survey phase to conduct a site survey. As noted above, a site survey may be conducted to check line-of-sight connectivity or validate a certain minimum signal threshold for line-of-sight connectivity.

At block 1602, constructing the wireless communication mesh network node may then involve a radio installation phase. For instance, as noted above, wireless communication mesh network radios (e.g., wireless communication mesh network radios 1202 and/or 1203) may be installed on a roof of a building using antenna mounts.

At block 1603, constructing the wireless communication mesh network node may also involve a power supply box installation phase. For instance, as described above, a power supply box (e.g., power supply box 1201) may be attached to the outside exterior wall or inside exterior wall of a building (e.g., customer's home).

At block 1604, constructing the wireless communication mesh network node may then involve a cable installation phase. As noted above, the cable installation phase may involve running electric cables between wireless communication mesh network radios (e.g., wireless communication mesh network radios 1202 and/or 1203) and the power supply box (e.g., power supply box 1201) to power the radios and carry data.

At block 1605, constructing the wireless communication mesh network node may then involve an alignment and configuration phase. This phase may involve fine antenna alignment to ensure a desired signal strength at the wireless communication mesh network radios, and configuration of these wireless mesh network radios to establish bi-directional communication links with other wireless communication mesh network radios at neighboring wireless communication mesh network nodes.

In turn, at block 1606, constructing the wireless communication mesh network node may then involve a router installation phase. For instance, as noted above, the router installation phase may involve installing a customer router (e.g., customer router 1208) and activating network services (e.g., high-speed Internet service).

It should be understood that the example phases described above may take various other forms as well.

In practice, a wireless communication mesh network node (e.g., type-A customer node 1200) may be dependent on neighboring wireless communication mesh network nodes to carry its end user (e.g., customer) data from a customer's router (e.g., customer router 1208) to a data center of a wireless communication mesh network. In this respect, wireless communication mesh network nodes may not only carry their own respective end user's data but may also help transfer data from other wireless mesh network nodes that belong to other end users of the wireless communication mesh network. Thus, it may not be possible to build wireless communication mesh network nodes in isolation and their end-to-end provisioning and testing may depend on the provisioning, testing, and/or powering of wireless communication mesh network radios from other wireless mesh network nodes (e.g., neighboring wireless communication mesh network nodes).

Further, in practice, the electrical work required to provide power to a given wireless communication mesh network node radio (e.g., blocks 1603-1604) may involve a significant amount of installation time. For instance, when electrical work to provide power to a given wireless communication mesh network node radio (e.g., wireless communication mesh network radio 1202) is required to be performed outside of a building, such electrical work may involve installation of a power supply box (e.g., power supply box 1201) and running electrical and data cables (e.g., cable 1204) from the power supply box to the roof of the building where the given wireless communication mesh network radio is installed. In instances where the electrical work to provide power to a given wireless communication mesh network node radio is required to be performed inside of a building, such electrical work may involve additional steps that require scheduling and coordination with a customer who owns or resides in the building.

Further yet, in practice, the successful completion of constructing a wireless communication mesh network node may depend on the completion of such electrical work required to provide power to a given wireless communication mesh network node radio, which may in turn facilitate establishing bi-directional communication links with other neighboring wireless communication mesh network nodes and collectively form a wireless communication mesh network. However, in some instances, even after such electrical work is completed, a given wireless communication mesh network radio may still not able to establish line-of-sight communications with a wireless communication mesh network radio from a neighboring wireless communication mesh network node or a building owner or customer may decide not to be part of the wireless communication mesh network. In such instances, while wireless communication mesh network radios and antenna masts can be removed and can be reused to build a different wireless mesh network node, the electrical work completed to provide power to a given wireless mesh network radio (e.g., cable and/or power supply box installation) cannot be reused and may result in loss of capital expenditures for a wireless communication mesh network operator.

In some instances, such electrical work may be delayed due to various reasons, such as a major renovation that may impact the power supplied to a given wireless communication mesh network radio. As a result, the delayed electrical work may also impact other neighboring wireless communication mesh network nodes (such as those in the respective directions of links 1206 and 1207) and in turn, impact the rollout of the wireless communication mesh network.

To address one or more problems involving the construction of a wireless communication mesh network node, a portable power supply may be used to efficiently provide power to a given wireless communication mesh network node radio (e.g., wireless communication mesh network node radio 1202), which may be installed on the roof of a building (or some other the outdoor location). The portable power supply may take various forms.

For example, the portable power supply may include a solar panel. It should be understood, however, that the portable power supply may take various other forms, such as a power supply that includes a backup battery. In this respect, the portable power supply may be capable of providing power to one or more radios for multiple days, weeks, or perpetually provide power (e.g., using solar panels).

In one embodiment, the portable power supply may be included in a portable modular unit that can be easily installed on a building. A portable modular unit may include antenna mounts, wireless communication mesh network radios, a portable power supply, among other equipment needed to construct a wireless communication mesh network node. In this respect, a portable modular unit may take various forms.

Figure 17:
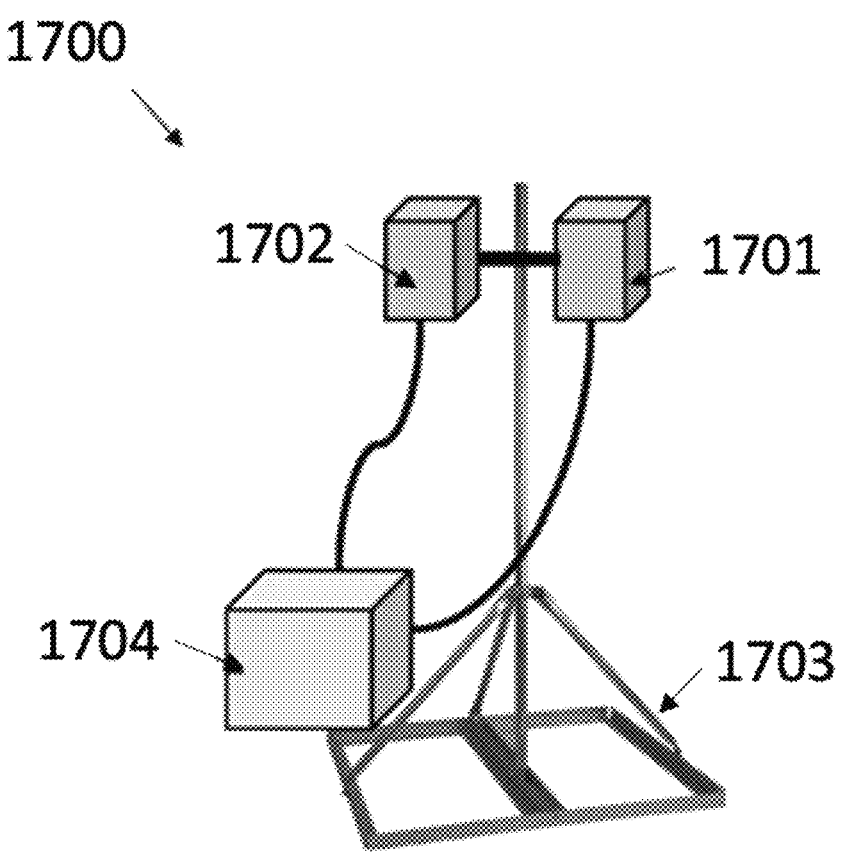
FIG. 17 depicts an example portable modular unit, in accordance with the present disclosure.

To illustrate, FIG. 17 depicts an example portable modular unit 1700 that can be installed at a wireless communication mesh network node (e.g., type-A customer node 1200). As shown, portable modular unit 1700 may include wireless communication mesh network radios 1701 and 1702 that may each take the form similar to wireless communication mesh network radios 1201 and/or 1202 described above.

Portable modular unit 1700 may also include antenna mount 1703 to mount wireless communication mesh network radios 1701 and 1702. Antenna mount 1703 may take the form of a non-penetrating or a penetrating antenna mount.

Further, portable modular unit 1700 may include portable power supply 1704. In one embodiment, portable power supply 1704 may use solar panels to provide electrical power to wireless communication mesh network radios 1701 and 1702 via electric cables. In another embodiment, portable power supply 1704 and/or portable modular unit 1700 may use a different power source (e.g., a battery) to power wireless communication mesh network radios 1701 and 1702.

Portable modular unit 1700 may take various other forms as well. For instance, portable modular unit 1700 may include other components not shown in FIG. 17. Further, while only two wireless communication mesh network radios are shown, portable modular unit 1700 may include any number of wireless communication mesh network radios.

In practice, a portable modular unit (e.g., portable modular unit 1700) may initially provide power to wireless communication mesh network radios (e.g., wireless communication mesh network radios 1701 and 1702), and enable a wireless mesh network installer to configure the wireless mesh network radios and activate the wireless communication mesh network node without requiring the installer to perform any electrical work (e.g., cable and/or power supply box installation at blocks 1603-1604 of FIG. 16). Once a particular section of the wireless communication mesh network is completed (e.g., by powering multiple wireless communication network nodes in a particular area of a neighborhood), the wireless communication mesh network installer may remove a portable power supply from the portable modular unit at a given wireless communication network node and replace it with an electrical cable run from a power supply box to draw power from the main power line of a building. Other components of a portable modular unit (e.g., wireless communication mesh network radios 1701 and 1702) may also be removed from the portable modular unit and installed using roof mounts. However, it should be understood that, in some embodiments, only the portable power supply (e.g., portable power supply 1704) may be removed from the portable modular unit.

Figure 18:
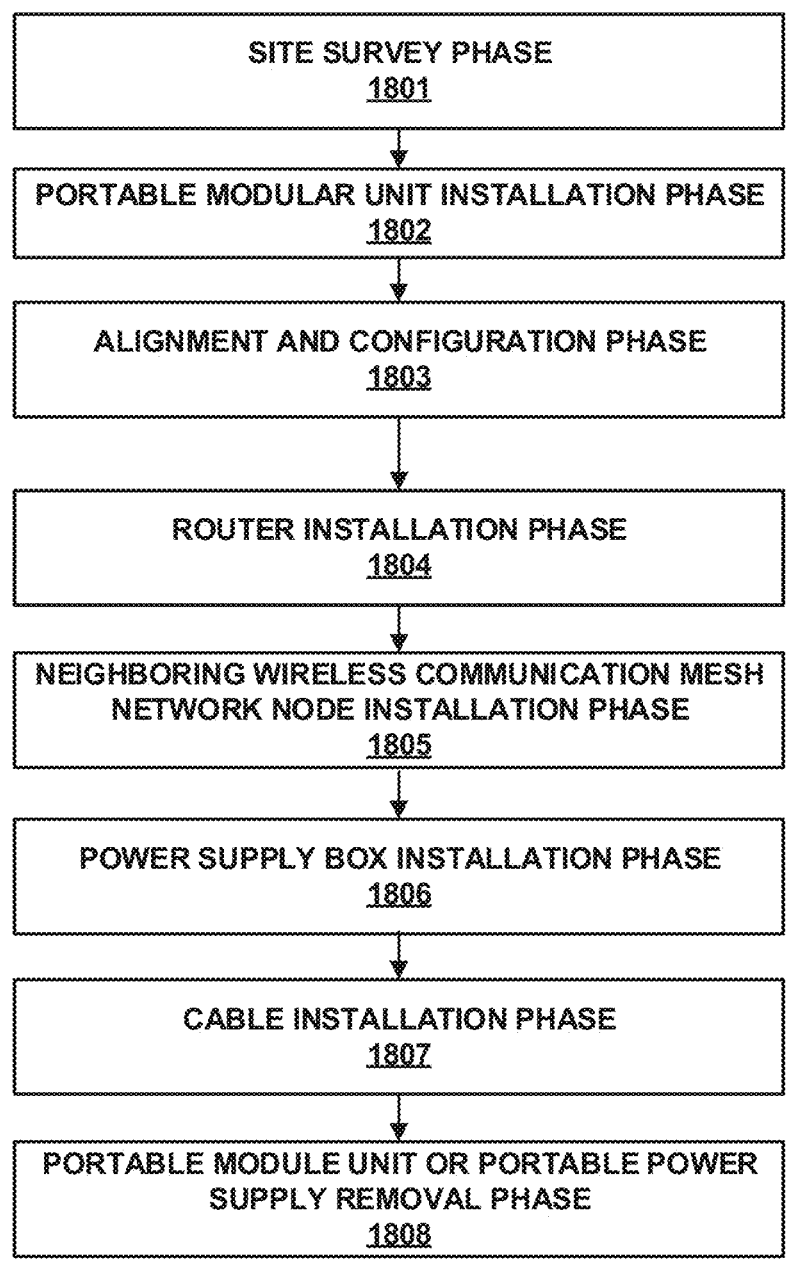
FIG. 18 depicts an example flow diagram for constructing a wireless communication mesh network node using a portable modular unit, in accordance with the present disclosure.

Turning to FIG. 18, an example flow diagram for constructing a wireless communication mesh network node (e.g., type-A customer node 1200 of FIG. 12) is shown using a portable modular unit (e.g., portable modular unit 1700). At block1801, constructing the wireless communication mesh network node may involve a site survey phase similar to the site survey phase described with respect to block 1601 of FIG. 16.

At block 1802, constructing the wireless communication mesh network node may then involve a portable modular unit installation phase, which may involve installing a portable modular unit, such as portable modular unit 1700 of FIG. 17, on the roof of a building (or some other the outdoor location).

At block 1803, constructing the wireless communication mesh network node may then involve an alignment and configuration phase similar to the alignment and configuration phase described above with respect to block 1605 of FIG. 16.

At block 1804, constructing the wireless communication mesh network node may involve a router installation phase similar to the router installation phase described above with respect to block 1606. For instance, as noted above, the router installation phase may involve installing a customer router (e.g., customer router 1208) and activating network services (e.g., high-speed Internet service). The wireless communication mesh network node may then be integrated as part of a wireless communication mesh network.

At block 1805, other wireless communication mesh network nodes (e.g., neighboring wireless communication mesh network nodes) may be constructed, and such construction may involve similar phases described above with respect to blocks 1801-1804. After constructing multiple wireless communication mesh network nodes in a given area (e.g., a given area in a neighborhood) that makes up a portion of a wireless communication mesh network, wireless communication mesh network installers may revisit a given wireless communication mesh network node location to complete the construction of the given wireless communication mesh network node.

At block 1806, for instance, constructing the wireless communication mesh network node may involve a power supply box installation phase similar to the power supply box installation phase described above with respect to block 1603.

At block 1807, constructing the wireless communication mesh network node may then involve a cable installation phase similar to the cable installation phase described above with respect to block 1604.

In turn, at block 1808, constructing the wireless communication mesh network node may involve a phase to remove the portable module unit (e.g., portable module unit 1700) or a portable power supply (e.g., portable module unit 1704) included as part of the portable module unit. The removed portable module unit and/or portable power supply may then be reused to construct new wireless communication mesh network nodes at other locations, which may involve the phases described above with respect to blocks 1801-1808. In some instances, the removed portable module unit and/or portable power supply may be reused to power existing wireless communication mesh network nodes that may be experiencing unanticipated power outages.

It should be understood that the example phases described above may take various other forms as well.

Figure 19:
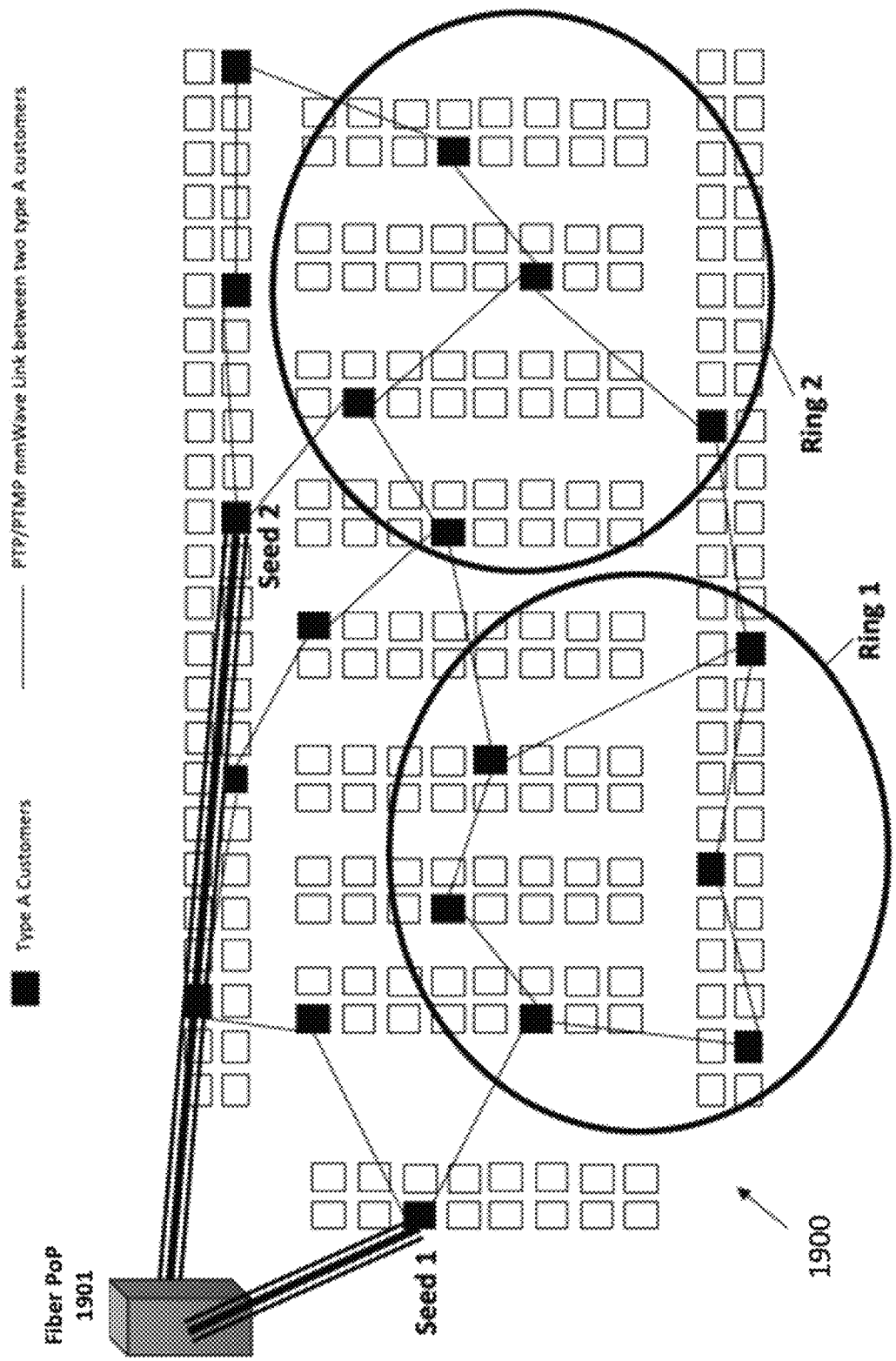
FIG. 19 depicts another example diagram of a wireless communication mesh network node, in accordance with the present disclosure.

Turning to FIG. 19, an example wireless communication mesh network 1900 is shown. As shown, wireless communication mesh network 1900 takes a form similar to wireless communication mesh network 1100 described above.

As further shown in FIG. 19, wireless communication mesh network 1900 includes a first area of a neighborhood (represented by "Ring 1") that comprises a first cluster of wireless communication mesh network nodes represented by solid black squares, and a second area of the neighborhood (represented by "Ring 2") that comprises a second cluster of wireless communication mesh network nodes represented by solid black squares.

In an example scenario, the installation of wireless communication mesh network nodes in Ring 2, which may involve configuration and access to the core network via Fiber PoP 1901, may be dependent on the installation of wireless communication mesh network nodes in Ring 1. In this respect, installation of wireless communication mesh network nodes in Ring 2 may be impacted if electrical work for one or more of the wireless communication mesh network nodes in Ring 1 are delayed due to various reasons noted above.

Accordingly, wireless communication mesh network nodes in Ring 1 may be initially constructed using a portable modular unit (e.g., portable modular unit 1700) as described above with respect to blocks 1801-1804 and wireless communication mesh network nodes in Ring 2 may be initially constructed in a similar fashion. At a later time (e.g., a time when the impact to wireless communication mesh network nodes in Ring 2 is low), the construction of communication mesh network nodes in Ring 1 may be completed as described above with respect to blocks 1806-1808, which may involve removing the portable module unit and/or a portable power supply included as part of the portable module unit. The removed portable module unit and/or a portable power supply may then be reused to construct new wireless communication mesh network nodes in a similar fashion described above with respect to FIG. 18.

The disclosed approach to constructing wireless communication mesh network nodes thus provides flexibility in scheduling various different construction phases while minimally impacting the construction of other wireless communication mesh network nodes and rolling out a wireless communication mesh network.

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

What is claimed is:

1. A wireless communication mesh network node of a wireless communication mesh network, the wireless communication mesh network node comprising:
   one or more wireless communication mesh network radios mounted to an exterior of a building via one or more antenna mounts, wherein each respective one of the one or more wireless communication mesh network radios is configured to establish a respective wireless communication link with a wireless communication mesh network radio of another wireless communication mesh network node of the wireless communication mesh network that is located at another building; and
   a coaxial interface that couples the wireless communication mesh network node to a power supply installed at the building via a pre-existing cable that was previously installed between a satellite dish and a cable set-top box but has since been disconnected from both the satellite dish and the cable set-top box, wherein the coaxial interface is configured to receive power from the power supply via the pre-existing cable and supply the received power to the one or more wireless communication mesh network radios, wherein a router installed at the building is connected to the power supply via a cable that delivers power to the router, and wherein the one or more wireless communication mesh network radios are configured to exchange data with the router via the pre-existing cable and the cable that delivers power to the router.

2. The wireless communication mesh network node of claim 1, wherein the one or more wireless communication mesh network radios comprise a first wireless communication mesh network radio that includes the coaxial interface.

3. The wireless communication mesh network node of claim 2, wherein the one or more wireless communication mesh network radios further comprise a second wireless communication mesh network radio, and wherein a power interface of the second wireless communication mesh network radio is (a) coupled to the first wireless communication mesh network radio via a separate cable, and (b) configured to receive power from the first wireless communication mesh network radio.

4. The wireless communication mesh network node of claim 2, wherein the coaxial interface is an integrated coaxial interface of the first wireless communication mesh network radio.

5. The wireless communication mesh network node of claim 1, wherein the coaxial interface comprises a cable splitter, and wherein an input of the cable splitter is coupled to the pre-existing cable and a respective output of the cable splitter is coupled to each of the one or more wireless communication mesh network radios.

6. The wireless communication mesh network node of claim 1, wherein: the one or more wireless communication mesh network radios comprise a first wireless communication mesh network radio that includes a power interface; and the wireless communication mesh network node further comprises a cable adaptor that connects the power interface of the first wireless communication mesh network radio to the coaxial interface.

7. The wireless communication mesh network node of claim 1, wherein the pre-existing cable that was previously installed connects to the power supply via a switch that is also coupled to the satellite dish via a separate cable.

8. The wireless communication mesh network node of claim 1, wherein the one or more wireless communication mesh network radios comprises a first wireless communication mesh network radio and a second wireless communication mesh network radio, and wherein the wireless communication mesh network node is (i) coupled, via the first wireless communication mesh network radio, to a first other wireless communication node of the wireless communication mesh network via a first respective wireless communication link and (ii) coupled, via the second wireless communication mesh network radio, to a second other wireless communication node of the wireless communication mesh network via a second respective wireless communication link.

9. The wireless communication mesh network node of claim 1, wherein each respective wireless communication link comprises a point-to-point wireless communication link or a point-to-multipoint wireless communication link.

10. The wireless communication mesh network node of claim 1, wherein each respective wireless communication link comprises a line-of-sight wireless communication link.

11. The wireless communication mesh network node of claim 1, wherein each respective wireless communication link comprises a millimeter wave wireless communication link.

12. A system comprising:
- a wireless communication mesh network node of a wireless communication mesh network, the wireless communication mesh network node comprising:
  - one or more wireless communication mesh network radios mounted to an exterior of a building via one or more antenna mounts, wherein each respective one of the one or more wireless communication mesh network radios is configured to establish a respective wireless communication link with a wireless communication mesh network radio of another wireless communication mesh network node of the wireless communication mesh network that is located at another building; and
  - a coaxial interface that couples the wireless communication mesh network node to a power supply installed at the building via a pre-existing cable that was previously installed between a satellite dish and a cable set-top box but has since been disconnected from both the satellite dish and the cable set-top box, wherein the coaxial interface is configured to receive power from the power supply via the pre-existing cable and supply the received power to the one or more wireless communication mesh network radios;
- a router installed at the building; and
- the power supply installed at the building,
  wherein the router is connected to the power supply via a cable that delivers power to the router, and wherein the router and the one or more wireless communication mesh network radios are configured to exchange data via the pre-existing cable and the cable that delivers power to the router.

13. A method comprising: mounting one or more wireless communication mesh network radios of a wireless communication mesh network node to an exterior of a building via one or more antenna mounts, wherein each respective one of the one or more wireless communication mesh network radios is configured to establish a respective wireless communication link with a wireless communication mesh network radio of another wireless communication mesh network node of the wireless communication mesh network that is located at another building; determining that the building has a pre-existing cable that was previously installed for use with a satellite dish; disconnecting the pre-existing cable from both the satellite dish and a cable set-top box; and connecting a coaxial interface of the wireless communication mesh network node to a power supply installed at the building via the pre-existing cable, wherein the coaxial interface is configured to receive power from the power supply via the pre-existing cable and supply the received power to the one or more wireless communication mesh network radios of the wireless communication mesh network node, wherein a router installed at the building is connected to the power supply via a cable that delivers power to the router, and wherein the one or more wireless communication mesh network radios are configured to exchange data with the router via the pre-existing cable and the cable that delivers power to the router.

\* \* \* \* \*